(12) United States Patent
Morris et al.

(10) Patent No.: US 9,430,953 B2
(45) Date of Patent: Aug. 30, 2016

(54) SIMULATION DEVICE WITH MOTION STABILIZATION

(71) Applicant: Hogan Mfg., Inc., Escalon, CA (US)

(72) Inventors: Donald Morris, Littleton, CO (US); David Johnson, Modesto, CA (US)

(73) Assignee: Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 14/602,150

(22) Filed: Jan. 21, 2015

(65) Prior Publication Data

US 2016/0148526 A1    May 26, 2016

Related U.S. Application Data

(63) Continuation-in-part of application No. 14/555,492, filed on Nov. 26, 2014, now Pat. No. 9,289,693.

(51) Int. Cl.
*A63G 31/16* (2006.01)
*G09B 9/04* (2006.01)
*B63B 27/00* (2006.01)

(52) U.S. Cl.
CPC ...................................... *G09B 9/04* (2013.01)

(58) Field of Classification Search
CPC ...... A63G 31/00; A63G 31/04; A63G 31/06; A63G 31/08; A63G 31/16; B63B 27/00; B63B 27/14
USPC ................ 472/59, 60, 130, 136; 434/29, 55; 14/71.7, 71.1
See application file for complete search history.

(56) References Cited

U.S. PATENT DOCUMENTS

| | | |
|---|---|---|
| 3,281,962 A | 11/1966 | Pancoe |
| 3,494,052 A | 2/1970 | Corlyon |
| 3,618,256 A | 11/1971 | Monks |
| 3,984,924 A | 10/1976 | Myles |
| 4,019,261 A | 4/1977 | Pancoe |
| 4,527,980 A | 7/1985 | Miller |
| 4,584,896 A | 4/1986 | Letovsky |
| 4,710,128 A | 12/1987 | Wachsmuth |

(Continued)

FOREIGN PATENT DOCUMENTS

| | | |
|---|---|---|
| DE | 198 82 812 B4 | 3/2011 |
| EP | 0 792 668 B1 | 11/2000 |

(Continued)

OTHER PUBLICATIONS

International Search Report and Written Opinion, mailed Jul. 27, 2015, issued in corresponding International Application No. PCT/US2015/012314, filed Jan. 21, 2015, 9 pages.

*Primary Examiner* — Kien Nguyen
(74) *Attorney, Agent, or Firm* — Christensen O'Connor Johnson Kindness PLLC

(57) ABSTRACT

A simulation device imparts a force corresponding to a simulated event on a user. The simulation device includes a motion base mounted to a moveable surface and a capsule mounted to the motion base. The user is positioned within the capsule during the simulated event, and the motion base is configured to move the capsule relative to the moveable surface. The simulation device further includes a sensor that senses movement of the moveable surface. A controller is operably coupled to both the sensor and the motion base. The controller receives a signal from the sensor and controls the motion base to move the capsule according to the simulated event and the signal received from the sensor.

15 Claims, 21 Drawing Sheets

(56) References Cited

U.S. PATENT DOCUMENTS

| | | | |
|---|---|---|---|
| 4,856,771 A | | 8/1989 | Nelson |
| 5,388,991 A | | 2/1995 | Morris |
| 5,453,011 A | | 9/1995 | Feuer |
| 5,507,647 A | | 4/1996 | Morris |
| 5,558,582 A | | 9/1996 | Swensen |
| 5,685,718 A | | 11/1997 | McClintic |
| 5,725,435 A | | 3/1998 | De Castro Faria |
| 5,752,834 A | | 5/1998 | Ling |
| 5,791,903 A | | 8/1998 | Feuer |
| 5,829,982 A | | 11/1998 | Advani |
| 5,921,780 A | | 7/1999 | Myers |
| 5,975,907 A | * | 11/1999 | Advani .................. A63G 31/16 434/29 |
| 5,993,216 A | | 11/1999 | Stogner |
| 6,007,338 A | | 12/1999 | DiNunzio |
| 6,210,164 B1 | * | 4/2001 | Otto .......................... G09B 9/02 434/29 |
| 6,431,989 B1 | * | 8/2002 | Katayama .............. A63G 31/16 434/55 |
| 6,902,402 B2 | | 6/2005 | McClintic |
| 7,866,982 B1 | | 1/2011 | Whitsitt |
| 8,672,288 B2 | | 3/2014 | van der Tempel |
| 2011/0207090 A1 | | 8/2011 | Margreiter |
| 2012/0180593 A1 | | 7/2012 | Alet |
| 2013/0108992 A1 | | 5/2013 | Buelthoff |
| 2013/0181728 A1 | | 7/2013 | Strohmer |
| 2013/0212812 A1 | | 8/2013 | Van Der Tempel |

FOREIGN PATENT DOCUMENTS

| | | |
|---|---|---|
| WO | 96/15514 A1 | 5/1996 |
| WO | 96/26512 A2 | 8/1996 |
| WO | 99/26215 A1 | 5/1999 |
| WO | 99/28095 A1 | 6/1999 |
| WO | 2013/178828 A1 | 12/2013 |

* cited by examiner

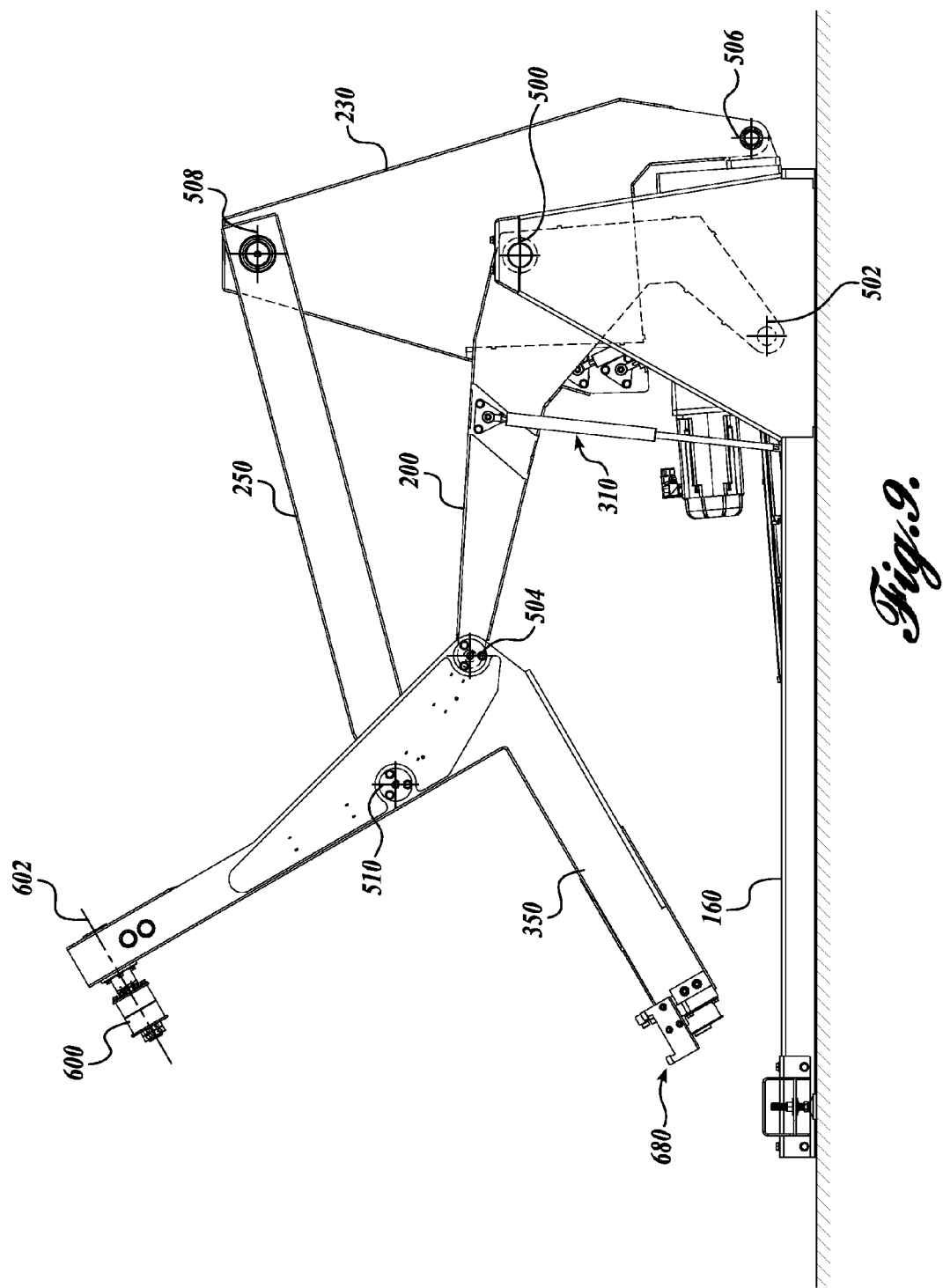

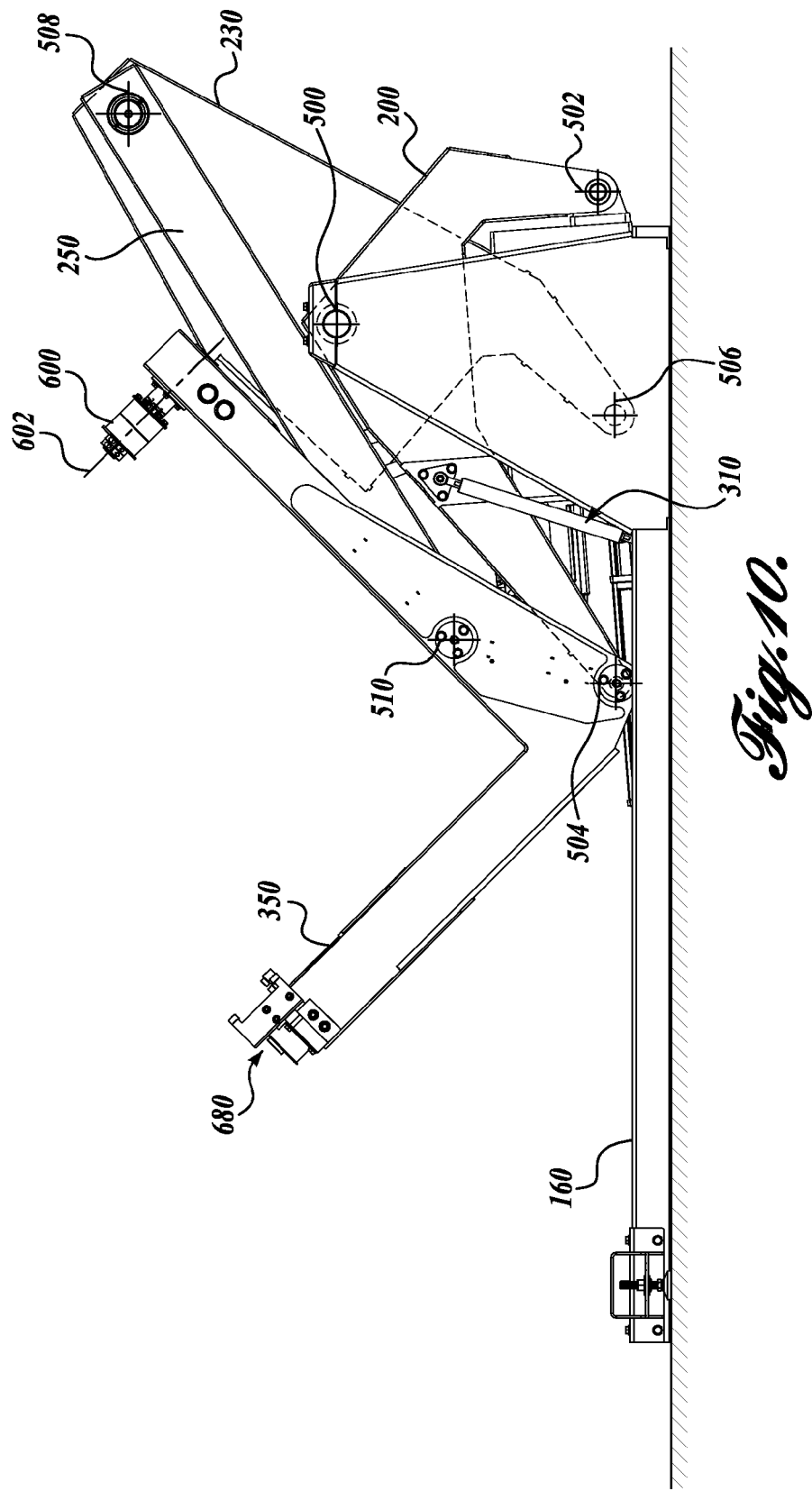

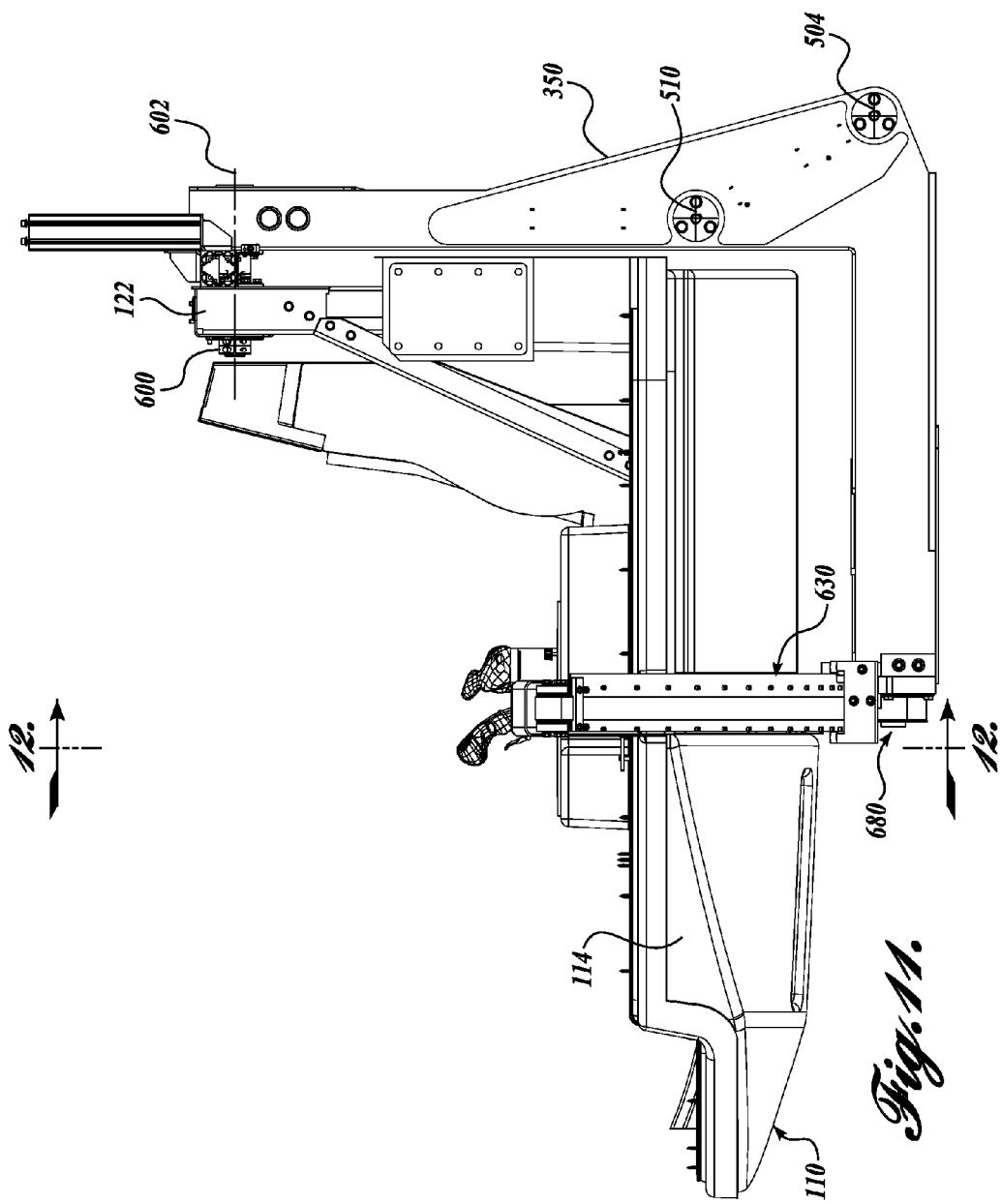

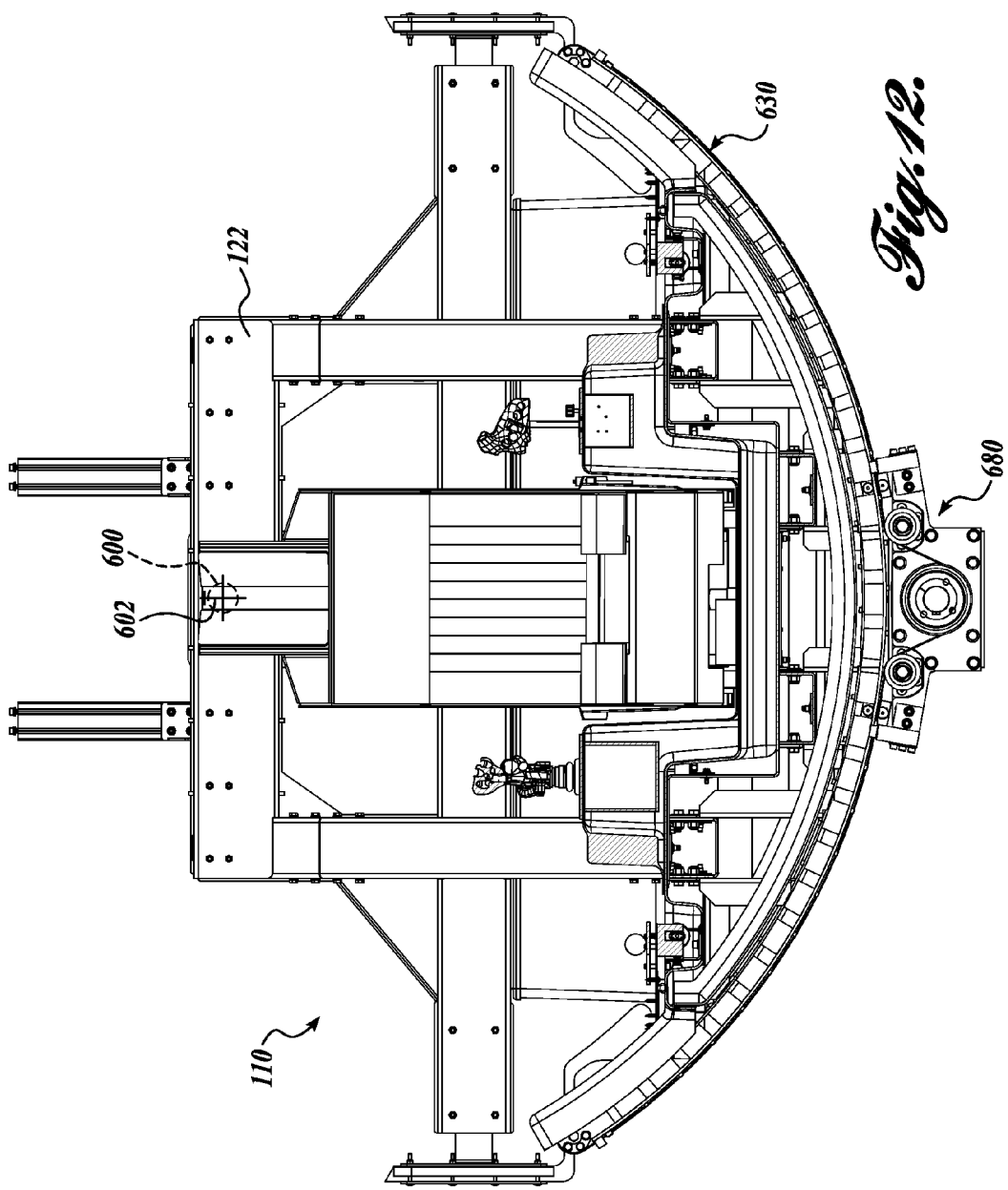

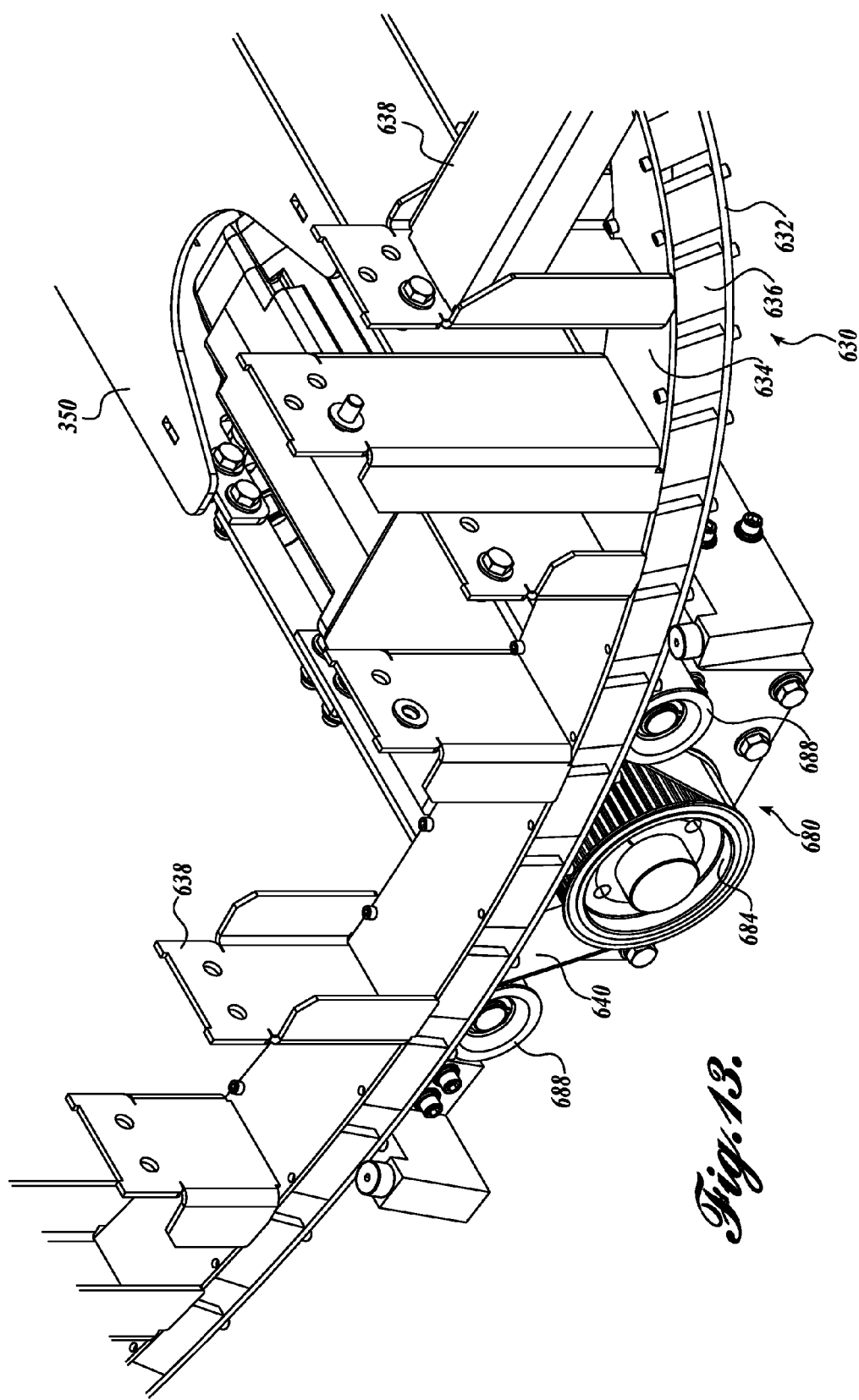

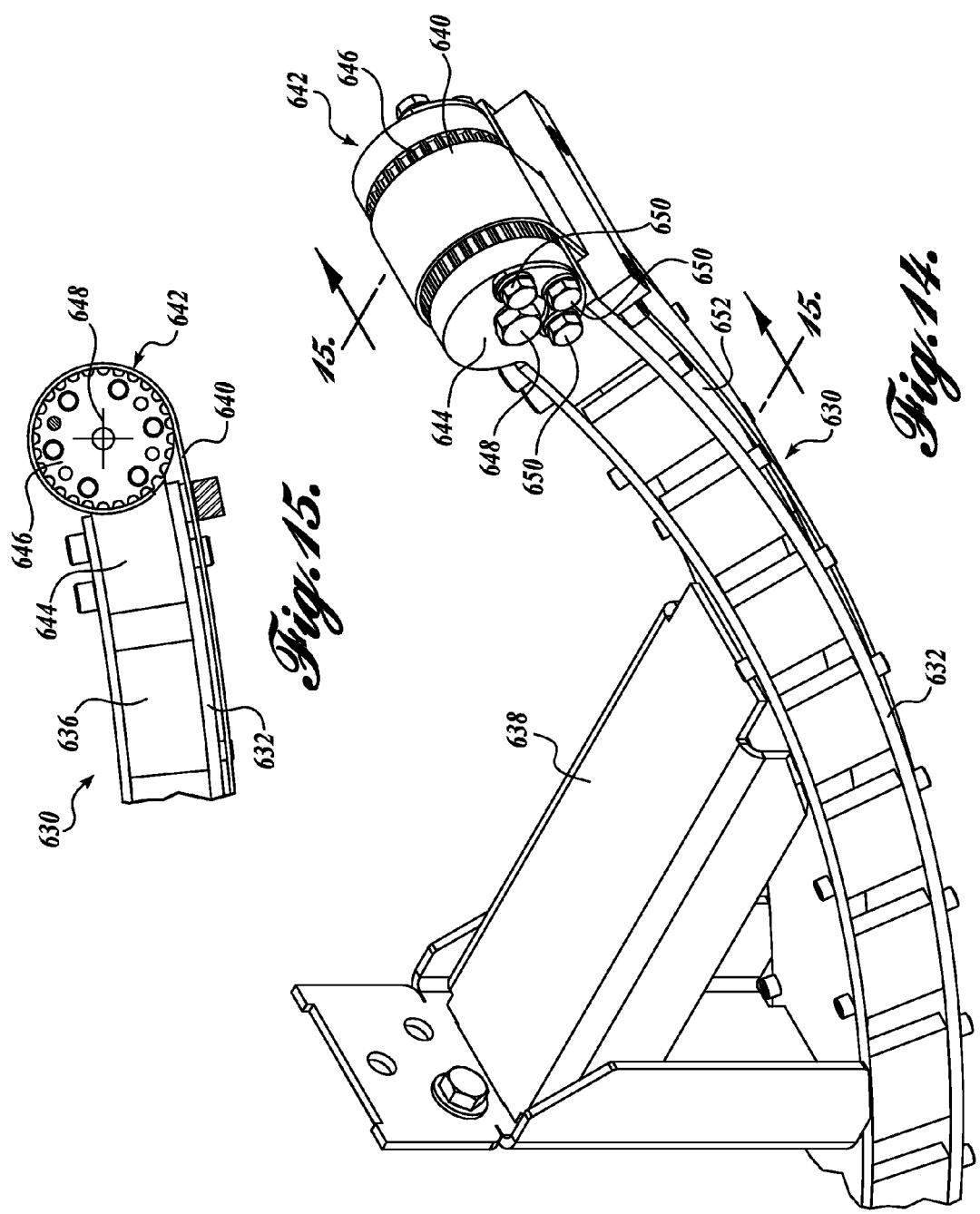

US 9,430,953 B2

SIMULATION DEVICE WITH MOTION STABILIZATION

CROSS-REFERENCE TO RELATED APPLICATION

The present application is a continuation-in-part of U.S. application Ser. No. 14/555,492, filed on Nov. 26, 2014, the disclosure of which is expressly incorporated by reference.

TECHNICAL FIELD

The present disclosure relates to simulators and, in particular, to a device for simulating motions while stabilizing the simulator to mitigate the influence of movement of the platform on which the simulator is mounted.

BACKGROUND

In order to create a realistic experience, modern flight simulators include photorealistic visual effects, surround sound, and synchronized motion. Such simulation technology is also used in the entertainment field. For example, amusement parks use simulators to provide customers with thrill rides that give the experience of loops, turns, and anti-gravitational effects. Known simulators can provide pitch, roll, and yaw, as well as surge, sway, and heave to simulate the physical sensations of a simulated event.

While fixed, permanent installations are suitable in many instances, it would be advantageous to have a simulator that is mounted to a moveable surface. For example, a simulator located on a ship would allow for simulation training while the ship is away from port. Further, such an installation would allow the simulator to move to different locations as the ship travels between destinations. However, a ship is itself subject to movement caused by waves, tides, wind, and other forces. The effect of such movement could potentially be felt during use of the simulator, thereby interfering with the simulated effects experienced by a user. Accordingly, there is a need for a simulation device and system for use on a ship or any other moveable surface, wherein the simulator provides any number of different simulated motions, including one or more of pitch, roll, and yaw, as well as surge, sway, and heave, and wherein the simulator senses and accounts for movement of the moveable surface and adjusts the movement of the simulator to compensate for movement of the moveable surface.

SUMMARY

A first exemplary embodiment of a simulation device imparts a force corresponding to a simulated event on a user. The simulation device includes a motion base mounted to a moveable surface and a capsule mounted to the motion base. The user is positioned within the capsule during the simulated event, and the motion base is configured to move the capsule relative to the moveable surface. The simulation device further includes a sensor that senses movement of the moveable surface. A controller is operably coupled to both the sensor and the motion base. The controller receives a signal from the sensor and controls the motion base to move the capsule according to the simulated event and the signal received from the sensor.

A second exemplary embodiment of a simulation device is used on a ship. The simulation device imparts a force corresponding to a simulated event to a user. The simulation device includes a motion base that is mountable to the ship and a capsule mounted to the motion base. A user is disposed within the capsule during the simulated event. The motion base is configured to move the capsule relative to the ship. The simulation device includes a user input and at least one sensor sensing movement of the ship. A controller is operably coupled to the at least one sensor, the user input, and to the motion base. The controller receives a signal from the sensor and the user input, and controls the motion base to move the capsule according to the simulated event, the user input, and the signal received from the sensor.

A method is also disclosed for imparting a force corresponding to a simulated event to a simulation capsule located on a moving surface. The method comprises the step of receiving a signal from a sensor that senses movement of the moving surface. The method further comprises the step of determining motion of the capsule to simulate an event. The method also includes the step of correcting the motion of the capsule to compensate for movement of the moving surface.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 shows a side view of a motion base of the simulation device shown in FIG. 4 with the base raised and pitched in a forward direction;

FIG. 10 shows a side view of a motion base of the simulation device shown in FIG. 4 with the base lowered and pitched in a rearward direction;

FIG. 11 shows a side view of the simulation device shown in FIG. 1, with a canopy and projectors removed from a capsule;

FIG. 12 shows a cross-sectional view of the simulation device shown in FIG. 11;

FIG. 13 shows a partial isometric view of a central portion of the drive assembly of the simulation device shown in FIG. 12;

FIG. 14 shows a partial isometric view of an end portion of the drive assembly of the simulation device shown in FIG. 12;

FIG. 15 shows a partial cross-sectional view of a the end portion of the drive assembly shown in FIG. 14;

DETAILED DESCRIPTION

Exemplary embodiments of the disclosed subject matter will now be described with reference to the accompanying drawings wherein like numerals correspond to like elements. Exemplary embodiments of the present invention are directed to motion simulators and more specifically, to portable motion simulators having a capsule mounted to a motion platform. In particular, several embodiments of the present disclosure are directed to simulation devices in which elevation, pitch angle, and roll angle of the capsule can be changed to provide a more realistic experience.

The following discussion proceeds with reference to examples of platforms for providing motion to simulator capsules containing one or more operators or passengers. While the examples provided herein have been described with reference to application to flight simulators, it will be apparent to one skilled in the art that this is done for illustrative purposes and should not be construed as limiting the scope of the disclosure, as claimed. Thus, it will be apparent to one skilled in the art that aspects of the present disclosure may be employed with any other simulation devices in which it is desirable to impart motion to operators or passengers in order to provide a more realistic experience, such as in amusement rides, automotive simulators, and the like.

The exemplary embodiments are described with reference to operators, it should be appreciated that the disclosure is not limited to embodiments in which the occupant actively provides input to the simulation device. In this regard, the user may be a passive occupant. Further, the simulation device is not limited to any particular number of users. Various embodiments that accommodate any number of passive or active occupants, or any combination thereof, are contemplated and should be considered within the scope of the present disclosure.

The following detailed description may use illustrative terms such as vertical, horizontal, forward, rearward, pitch, roll, etc. However, these terms are descriptive in nature and should not be construed as limiting. Further, it will be appreciated that embodiments of the present invention may employ any combination of features described herein.

Figure 1:
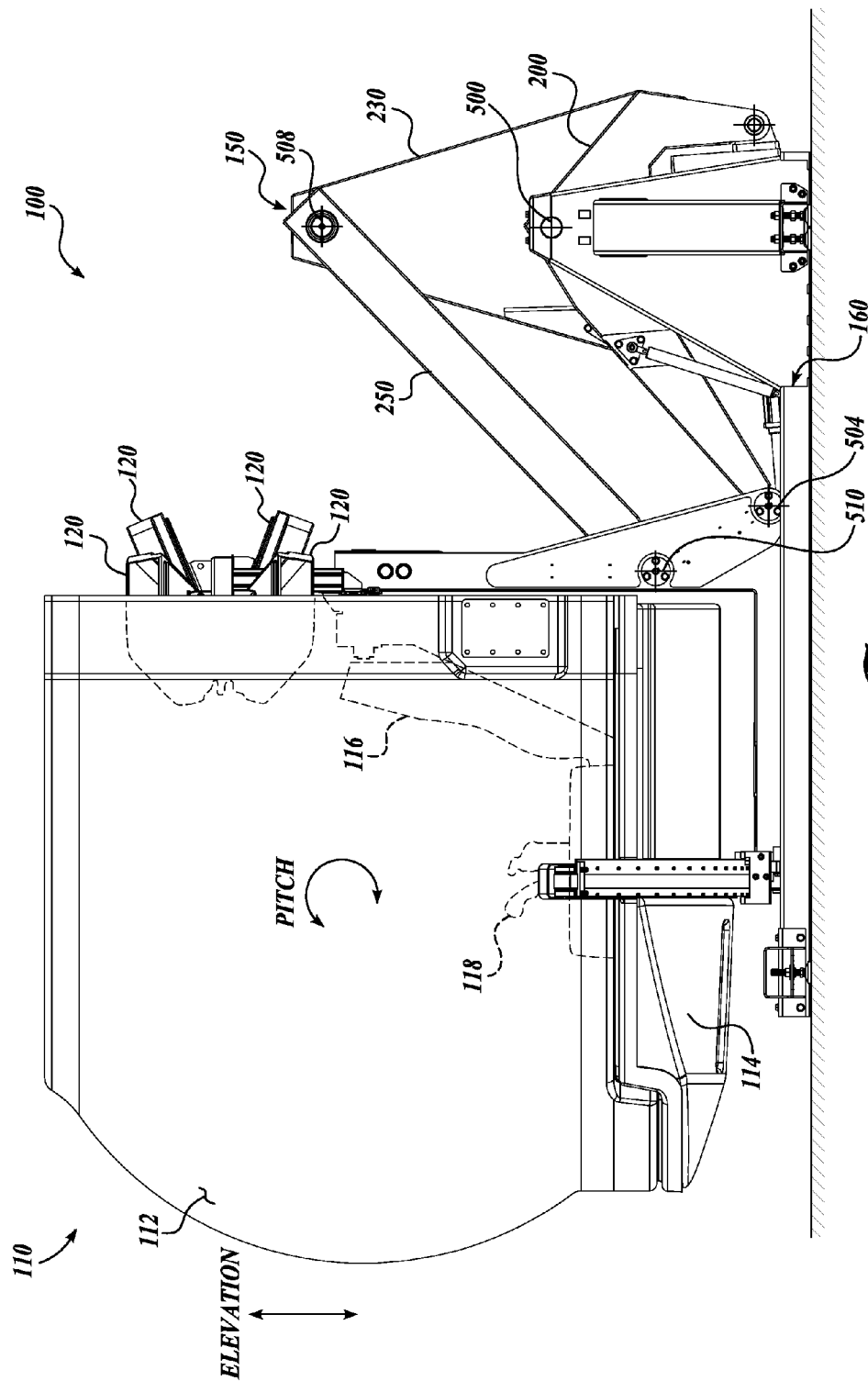
FIG. 1 shows a side view of an exemplary embodiment of a simulation device with a capsule mounted to an apparatus for imparting motion to the capsule.
Figure 2:
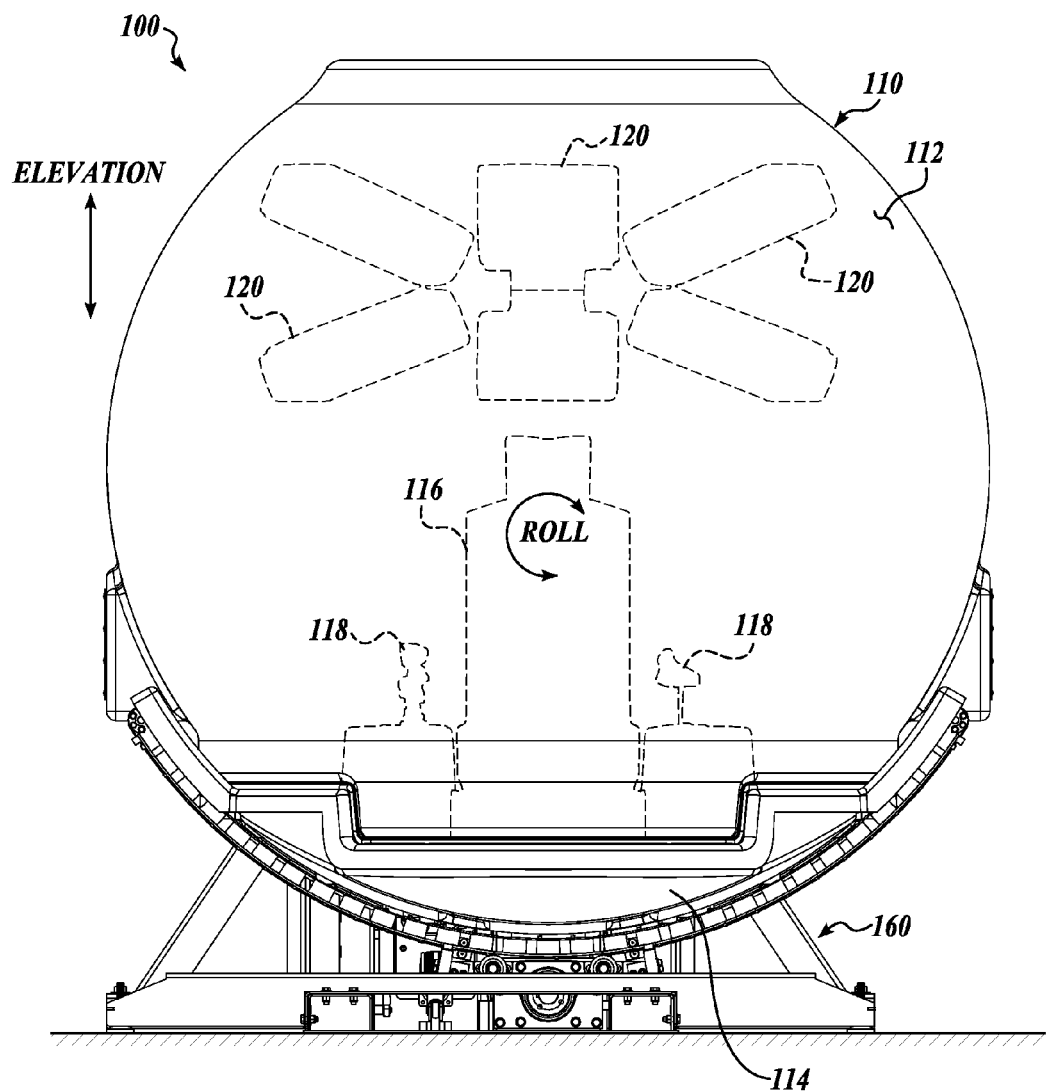
FIG. 2 shows a front view of the simulation device shown in FIG. 1.
Figure 3:
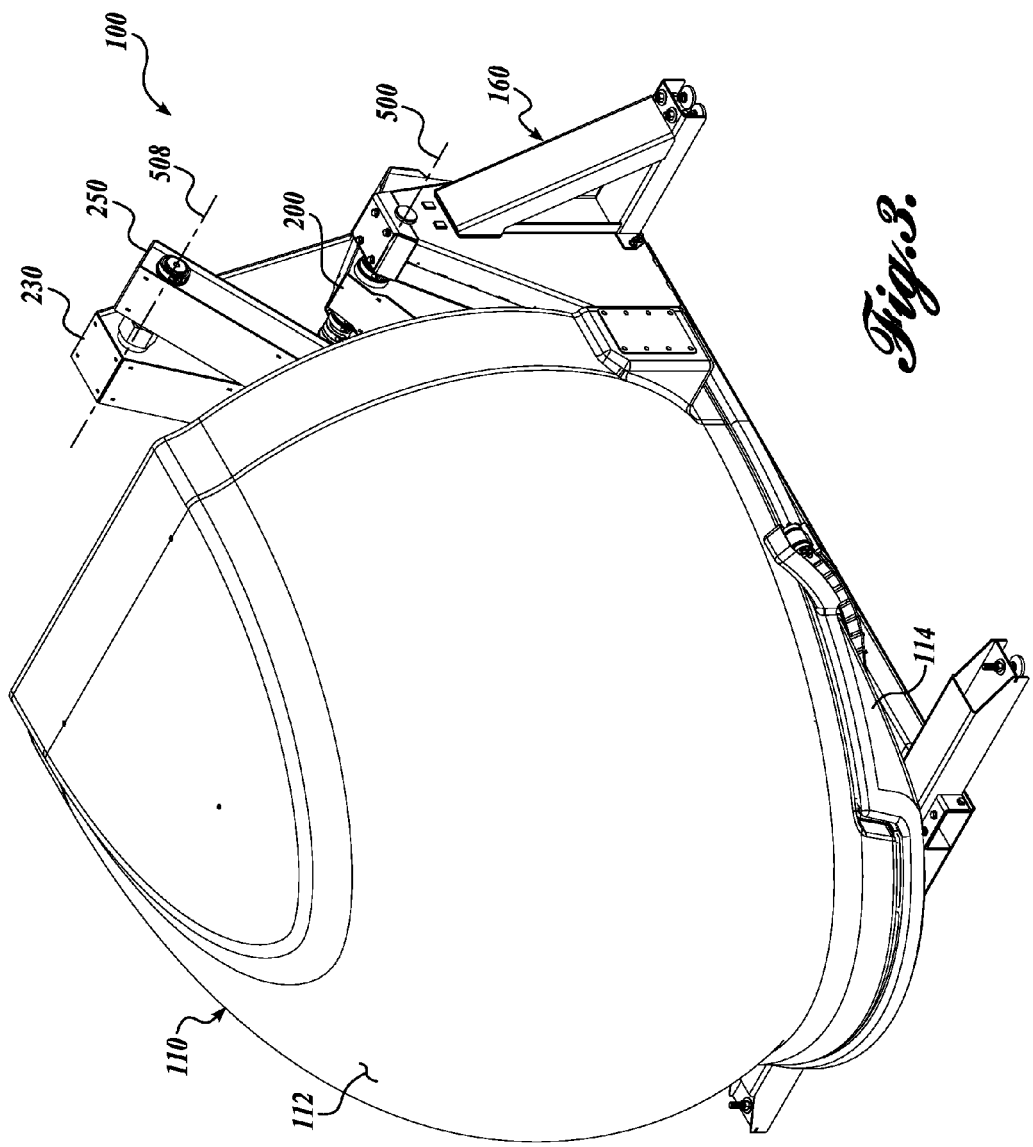
FIG. 3 shows an isometric view of the simulation device shown in FIG. 1 in a lowered position.
Figure 4:
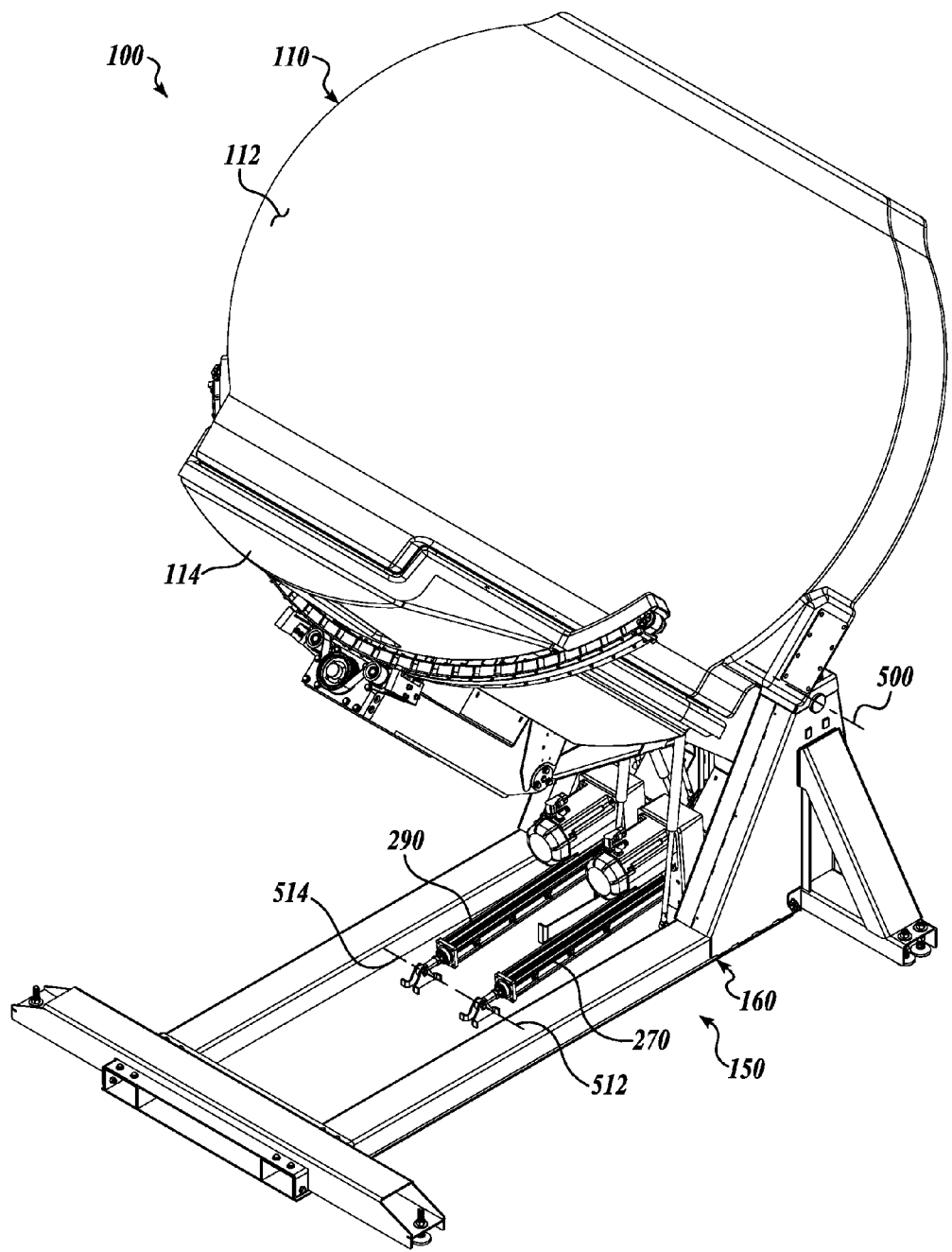
FIG. 4 shows an isometric view of the simulation device shown in FIG. 1 in a raised position.

FIG. 1 shows a side view of an exemplary embodiment of a simulation device 100 in accordance with the present disclosure. The device 100 includes a capsule 110 mounted to motion platform 150. The capsule 110 has a canopy 112 mounted to a capsule body 114. In the illustrated embodiment, the canopy 112 is rotatably mounted to the capsule body 114 to provide ingress and egress for the user. The components of the capsule 110 are preferably made from lightweight materials, such as fiberglass, graphite, or aluminum; having suitable strength and durability; however alternate materials may be utilized to provide adequate strength or other desirable material properties for particular components.

A seat 116 and operator controls 118 are located within the capsule body 114. A plurality of high resolution projectors 120 is mounted above the seat 116 at a rear portion of the capsule 110. The projectors 120 preferably project photorealistic images over the head of the occupant onto an interior surface of the canopy, thereby providing the occupant with a visual representation of the event being simulated.

The illustrated embodiment is configured for use as a single occupant flight simulator. Other embodiments in which the number, type, and locations of the seats and operator controls vary to accommodate different numbers of users and to simulate different situations are contemplated. Further, the number and locations of the projectors, as well as the images projected within the capsule can vary to provide difference simulations. These and other variations are contemplated and should be considered within the scope of the present disclosure Referring now to FIGS. 1-4, the capsule 110 is mounted to a motion platform 150. As will be described in greater detail, the motion platform 150 is capable of accelerating the capsule in a vertical direction, pitching the capsule forward and backward, and rolling the capsule about a longitudinal axis. The acceleration experienced by the capsule 110 during these movements combines with gravitational forces and the visual displays within the capsule to provide the operator with a more realistic simulation. That is, the person inside the capsule will not only see the simulated movements on the displays, but will also feel forces corresponding to those movements. The use of motion in combination with visual simulation images has been utilized in various simulation devices. For example, in U.S. Pat. No. 5,388,991, issued to Morris, the disclosure of which is expressly incorporated herein, teaches using vertical acceleration, pitch, and roll in combination with photorealistic images to simulate the motions associated with high speed looping roller coasters, bobsled rides, water rides, flying rides, driving rides, and the like.

Referring now to FIGS. 1-7, and as will be described in further detail, the motion platform 150 includes a base 160 with a first arm 200 rotatably coupled thereto. A drive element 230 is also rotatably coupled to the base 160, and a second arm 250 is rotatably coupled to the drive element 230. The first and second arms 200 and 250 are rotatably coupled to a frame 350 that supports the capsule 110. The motion platform 150 further includes a first actuator 270 that selectively rotates the first arm 200 and a second actuator 290 that selectively rotates the drive element 230. Selective rotation of the first arm 200 and the drive element 230 allows the elevation and the pitch of the capsule to be controlled to simulate forces within the capsule that correspond to a simulated event.

The disclosed component assemblies of the motion platform 150 are preferably made from beams, plates, fittings, and other parts made from steel, aluminum, or other suitable materials. These components are connected by known methods, such as fasteners, welding, and the like. It is contemplated, however, that the disclosed components and assemblies can utilize various alternate materials, joint types, configurations, manufacturing and assembly techniques, and combinations thereof that are known in the art and provide suitable strength and durability. Accordingly, such variations of the disclosed embodiments should be considered within the scope of the present disclosure.

Figure 5:
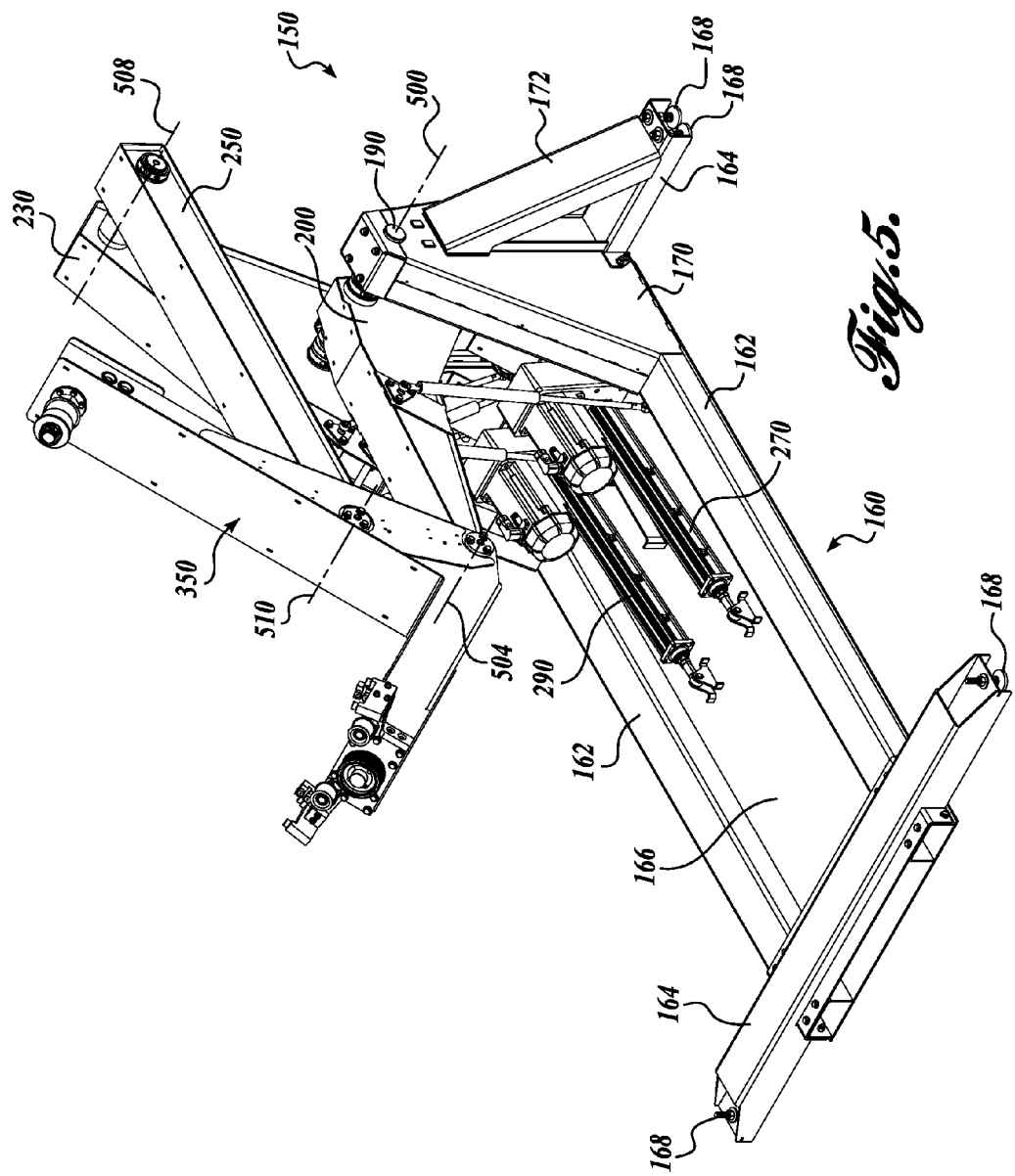
FIG. 5 shows a front isometric view of a motion base of the simulation device shown in FIG. 4.
Figure 6:
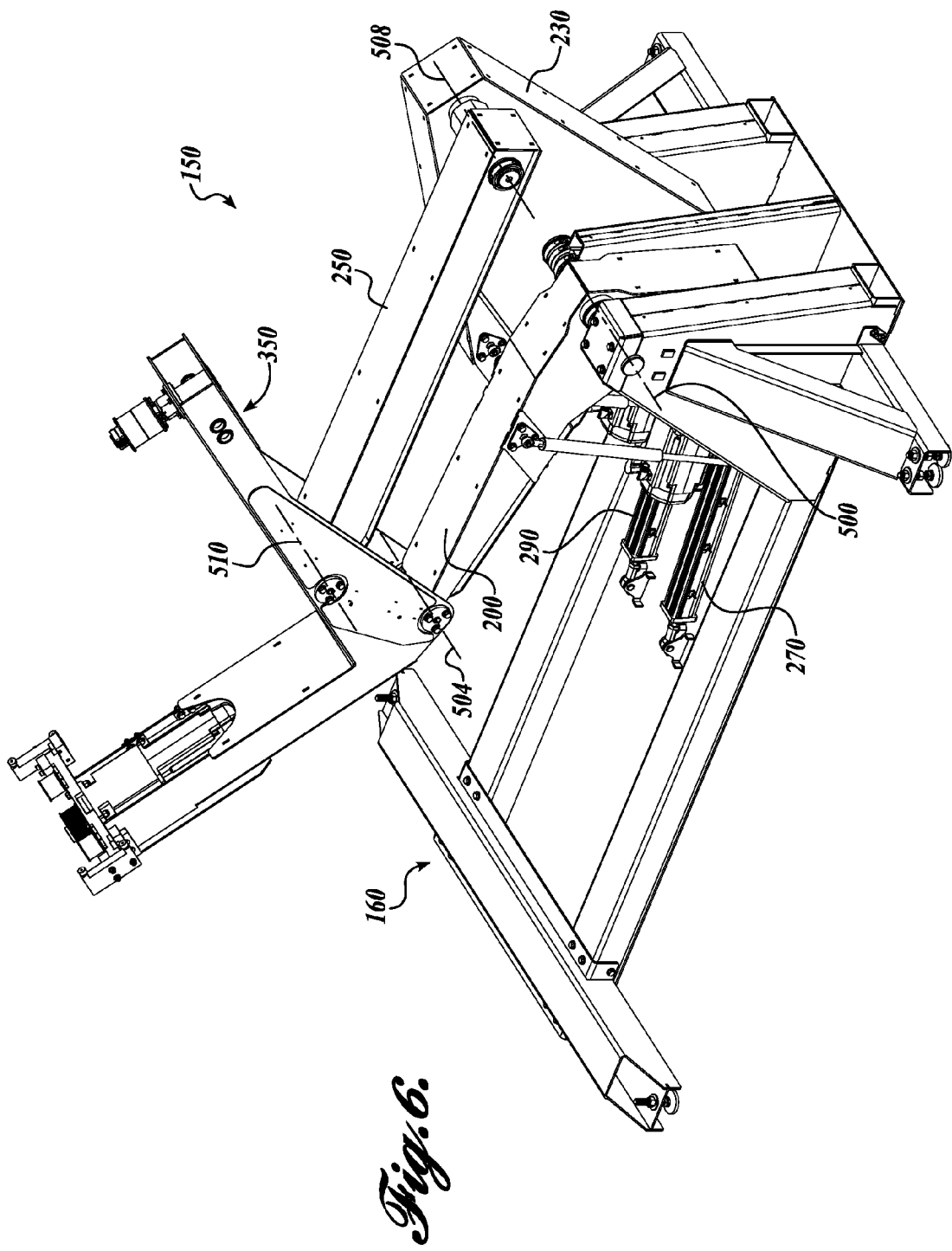
FIG. 6 shows a rear isometric view of a motion base of the simulation device shown in FIG. 4.

Still referring to FIGS. 1-7, the illustrated embodiment of the motion platform 150 includes a base 160 supporting the capsule 110 and associated elements of the motion platform. As best shown in FIG. 5, the base 160 includes longitudinal members 162 coupled to lateral members 164 to form a rectangular structure. A flat panel 166 is coupled to the bottom of the longitudinal and lateral members 162 and 164 to provide additional stability and a surface to which components of the motion platform 150 may be secured. Adjustable feet 168 are preferably secured to the bottom of the base 160 to allow the base to be leveled when placed on sloped or uneven surfaces.

Figure 7:
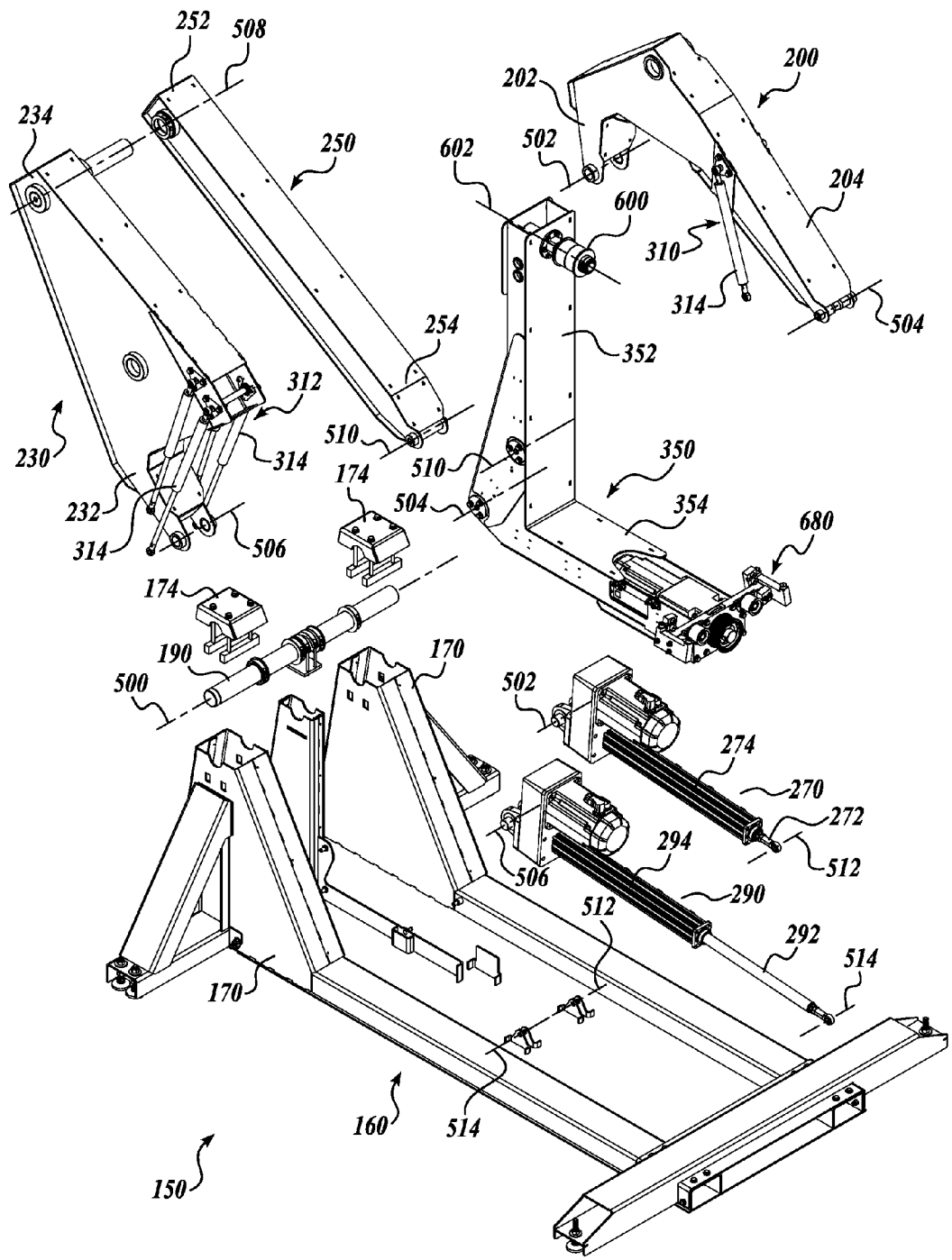
FIG. 7 shows a partially exploded front isometric view of a motion base of the simulation device shown in FIG. 4.

Supports 170 are coupled to and extend upwardly from one end of the base 160. Braces 172 optionally extend from the supports 170 to the lateral members 164 to provide additional lateral stability. As best shown in FIG. 7, a pin 190 spans the upper end of the supports 170 to define a generally horizontal axis 500. In the disclosed embodiment, the pin 190 is retained against the supports 170 by caps 174 secured to the tops of the supports to form an aperture through which the pin extends.

It will be appreciated that configuration of the disclosed base is exemplary, and that other configurations are possible. In this regard, various other configurations of a compact base for supporting the capsule 110 that provides suitable stability to the simulation device 100 during use are contemplated and should be considered within the scope of the present disclosure.

The lift arm 200 is rotatably coupled to the base 160 about an axis 500. In the illustrated embodiment, the lift arm 200 has an aperture extending through a middle portion. Flanged bushings are installed on both sides of the aperture, and the pin 190 extends through and engages the bushings so that the lift arm 200 is rotatable relative to the base 160. It will be appreciated that alternate configurations to rotatably mount the lift arm 200 to the base are possible, and the present disclosure is not limited to the illustrated embodiment in this regard.

A first end 202 of the lift arm 200 is rotatably coupled the first actuator 270 about an axis 502, which is parallel to axis 500. A second end 204 of the lift arm 200 is rotatably coupled to the frame 350 about an axis 504, which is parallel to axes 500 and 502. Both joints are rotational joints known in the art. In one exemplary embodiment, one side of the joint comprises a clevis, and the other side of the joint comprises a lug, wherein the clevis and the lug are rotatable relative to each other about a pin. It will be appreciated that these and other disclosed rotational joints may be of any suitable configuration and are not limited to those shown in the illustrated embodiment.

As will be described in further detail, the first actuator 270 selectively drives the lift arm 200 to rotate in a first direction and a second direction about axis 500. That is, the first actuator 270 moves axis 502 along an arcuate path about axis 500, which moves axis 504 along an arcuate path about axis 500 as well.

Still referring to FIG. 7, the drive element 230 is rotatably coupled to the base 160. In the illustrated embodiment, the drive element 230 is mounted using pin 190 to be rotatable about axis 500. In one alternate embodiment, both the first arm 200 and the drive element 230 are rotatable about axis 500 by different pins. In another alternate embodiment, the drive element 230 and first arm 200 are rotatable about offset parallel axes.

A first end 232 of the drive element 230 is rotatably coupled to the second actuator 290 about an axis 506, which is parallel to axis 500. A second end 234 of the drive element 230 is rotatably coupled to a first end 252 of the pitch arm 250 about an axis 508, which is parallel to axes 500 and 506. As will be described in further detail, the second actuator 290 selectively drives the first end 232 of the drive element 230 to rotate in a first direction and a second direction about axis 500. That is, the second actuator 290 moves axis 506 along an arcuate path about axis 500, which moves axis 508 along an arcuate path about axis 500 as well.

A second end 254 of the pitch arm 250 is rotatably coupled to the frame 350 about axis 510, which is parallel and offset from axis 504. In the illustrated embodiment, the pitch arm 250 is offset from the drive element 230 so that the pitch arm is disposed above the lift arm 200. Thus, the drive element 230 acts as a rocker to drive the pitch arm 250, and the pitch arm moves axis 510 relative to axis 504 to change the pitch of the frame 350 and, therefore, the capsule 110.

The frame 350 is a generally L-shaped structure having an upper, vertical portion 352 and a lower, horizontal portion 354. The lift arm 200 and the pitch arm 250 are rotatably coupled to the vertical portion 352 so that axes 504 and 510 are parallel and offset from each other along the frame. Generally speaking, rotation of the lift arm 200 raises and lowers the frame, while rotation of the drive element 230 moves the pitch arm 250 to rotate the frame 350 about axis 504. However, the pitch of the frame 350 can also be changed by rotating the lift arm 200 while maintaining the position of the drive element 230. Further, the pitch of the frame 350 can be changed by various combinations of rotating both the lift arm 200 and the drive element 230. It will be appreciated, however, that the disclosed frame configuration is one exemplary embodiment, and various alternate frame configurations are possible within the scope of the present disclosure.

In the illustrated embodiment, each of the first and second actuators 270 and 290 is a linear actuator comprising a rod 272 and 292 that extends from and retracts into a cylinder 274 and 294. Still referring to FIG. 7, the rod of each actuator is rotatably coupled to the base 160 about axes 512 and 514, and the cylinder of each actuator 270 and 290 is rotatably coupled to one of the lift arm 200 and the drive element 230, respectively. When the rod extends from the cylinder, the actuator rotates the lift arm 200 or drive element 230 about axis 500 in a first direction. When the rod retracts into the cylinder, the actuator rotates the lift arm 200 or drive element 230 about axis 500 in a second direction opposite the first direction. Each actuator is operably connected to a controller (not shown) that controls the actuators according to a simulation program and operator input.

Figure 8:
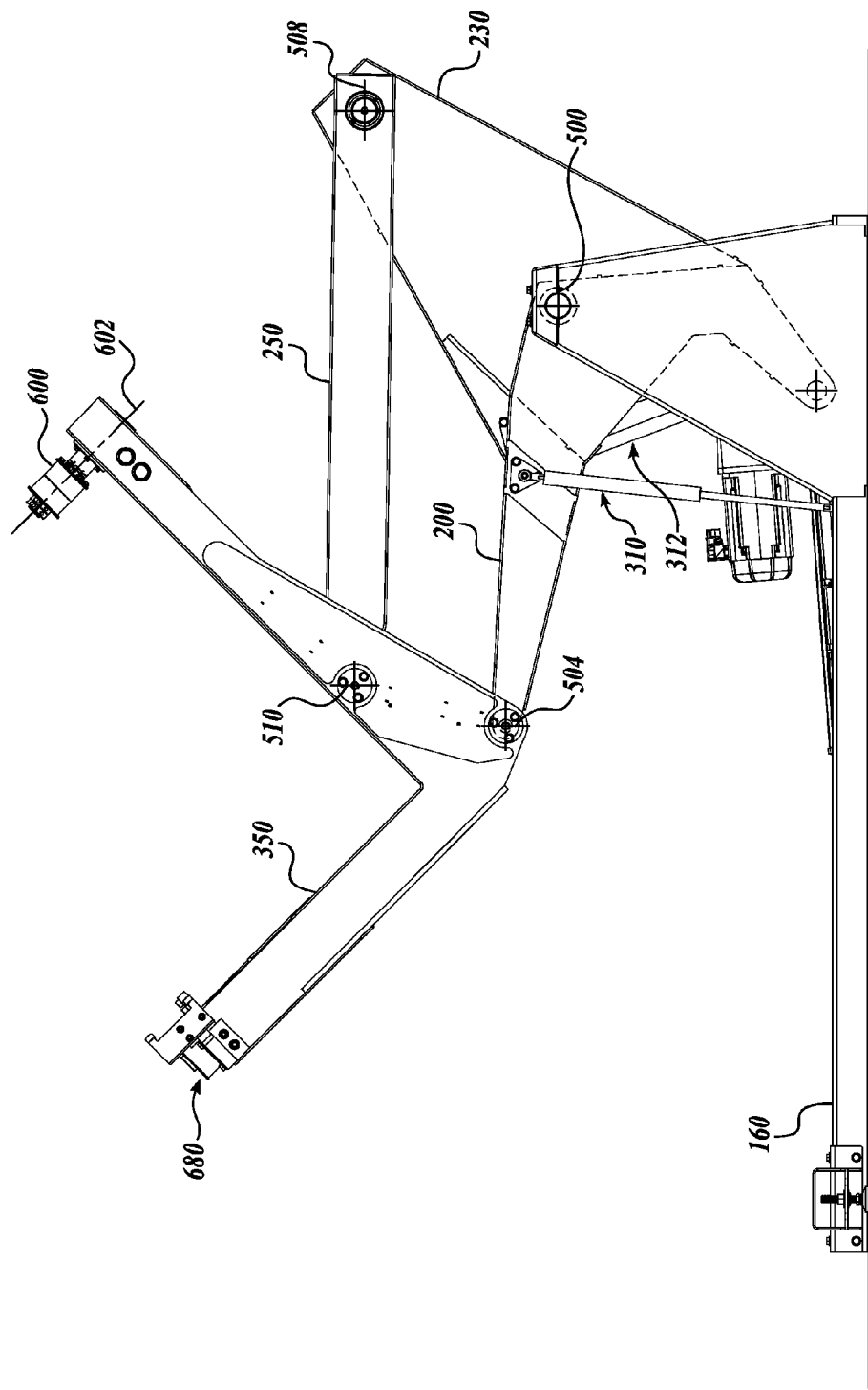
FIG. 8 shows a side view of a motion base of the simulation device shown in FIG. 4 with the base raised and pitched in a rearward direction.

During operation, the weight of the capsule 110 is supported by the lift arm 200 and pitch arm 250, the positions of which are controlled by the actuators 270 and 290. In order to reduce the forces required by the actuators 270 and 290 to maintain the position of the capsule 110 and to move the capsule, counterbalances 310 and 312 are preferably included to help support the capsule 110. In the illustrated embodiment, each counterbalance 310 and 312 comprises one or more of compression springs 314, each of which provides a force that resists counterclockwise rotation (as viewed in FIG. 8) of the lift arm 200 and drive element 230, respectively, thereby at least partially supporting the capsule 110. This, in turn, allows for the use of smaller actuators as the actuators are required to support a smaller portion of the overall capsule weight.

For the lift arm 200, the counterbalance 310 includes a pair of gas springs 314 rotatably coupled at a first end to opposing sides of the lift arm. A second end of each gas spring 314 is rotatably coupled to a portion of the base 160. Accordingly, rotation of the lift arm 200 extends and compresses each gas spring 314.

Similar to the lift arm counterbalance 310, the pitch arm counterbalance 312 comprises a plurality of gas springs 314 rotatably coupled at a first end to the drive element 230 and rotatably coupled at a second end to the base 160. In the illustrated embodiment, the counterbalance 312 includes four gas springs 314 that are extended and compressed with the movement of the pitch arm 250 that results from rotation of the drive element 230.

For each counterbalances 310 and 312, it should be appreciated that the number, placement, and types of springs can vary. In one exemplary embodiment, the springs 314 are compression coil springs. In another embodiment, the counterbalances 310 and 312 have an equal number of springs, but with different spring rates. Further, the springs and the amount of preload in each spring can vary to account for different counterbalancing needs for different configurations of the motion platform 150. These and other variations are contemplated and should be considered within the scope of the present disclosure.

Turning now to FIGS. 7-16, the roll mechanism of the motion platform will now be described. In the illustrated embodiment, the lift arm 200 and pitch arm 250 control the elevation and pitch of the frame 350, and the capsule 110 is rotatable relative to the frame. In this manner rotation (roll) of the capsule is controlled independent of pitch and elevation. Accordingly, embodiments are contemplated wherein control of the capsule 110 is limited to pitch and elevation, i.e., the simulation device 100 does not provide any roll. Similarly, other embodiments are contemplated, wherein the simulation device 100 can be controlled to roll the capsule without the elevation or pitch control, for example, if the disclosed frame were directly mounted to a fixed base. Moreover, it will be appreciated that the disclosed pitch/elevation system can be utilized with alternate roll mechanisms, and the disclosed roll mechanism can be utilized with alternate systems to control pitch and/or elevation. These and other configurations are possible and should be considered within the scope of the present disclosure.

A trunnion 600 extends from the upper portion 352 of the frame 350 to define a roll axis 602 for the capsule 110. In the illustrated embodiment, the trunnion 600 is perpendicular to the upper portion 352 of the frame 350 and is generally horizontal when the simulation device is in a load position; however, it will be appreciated that the position and orientation of the trunnion 600 can vary within the scope of the present disclosure. For example, the roll axis 602 in the disclosed embodiment is positioned at approximately the level of the capsule occupant's head. It has been found that when the roll axis 602 is located in this position, the rotation of the capsule 110 provides a roll sensation that is suitable for amusement simulations; that is, the rotation of the capsule does not put undue strain on a passenger's neck and is not as likely to make the passenger nauseous. It will be appreciated, however, that different simulation experiences may feel more realistic to the passenger when the roll axis is located away from the passenger's head. Accordingly, embodiments are contemplated wherein the roll axis 602 is located away from a passenger's head.

As best shown in FIGS. 11 and 12, the capsule body 114 includes a frame 122 that is mounted to the trunnion 600 so that the frame and, therefore, the capsule 110, are rotatable about the roll axis 602. In the disclosed embodiment, the capsule frame 122 is coupled to the trunnion 602 using bushings, bearings, or any other suitable configuration known in the art to provide a rotational joint that has sufficient strength and durability, while allowing the capsule 110 to rotate about axis 602 relative to the trunnion 600 without undue resistance. Further, it will be appreciated in one alternate configuration, the trunnion is mounted to the capsule 110 rather than to the frame 350 of the motion platform 150.

Referring now to FIGS. 11-15, the capsule 110 includes a support assembly 630 disposed on a lower surface of the capsule. The support assembly is supported by and driven by a drive assembly 680 positioned on an end of the lower, horizontal portion 354 of the frame 350.

The support assembly 630 includes a lower flange 632 offset from an upper flange 634. The lower flange 632 has an arcuate support surface 652 disposed on a bottom portion of the flange. A plurality of spacers 636 is disposed between and coupled to the upper and lower flanges 634 and 632, to secure the upper and lower flanges to each other and to maintain their location relative to each other. A plurality of fittings 638 is coupled to the upper flange to provide suitable strength and rigidity and to couple the support assembly 630 to the capsule body 114 or to any other suitable portion of the capsule 110.

A belt 640 extends along the lower surface of the lower flange 632. The belt 640 is secured at each of the support assembly 630 by a restraint 642. In the illustrated embodiment, the restraint 642 from one side of the support assembly 630 is similar to the restraint on the opposite side of the support assembly. Thus, the restraint 642 shown in FIGS. 14 and 15 will be described with the understanding that the disclosed embodiment of the support assembly 630 includes a similar restraint 642 at the opposite end.

The restraint 642 includes an end fitting 644 secured to the end of the support assembly 630. In the illustrated embodiment, the end fitting 644 is a clevis secured between the upper and lower flanges 634 and 632 of the support assembly 630. A grooved sprocket 646 is rotatably coupled to the lugs of the end fitting 644 by bolt 648 that extends axially through the lugs and the sprocket. One or more set bolts 650 extend through the end fitting 644 and the sprocket 646 to prevent rotation of the sprocket relative to the end fitting about bolt 648.

The belt 640 in the illustrated embodiment is a synchronous belt, having teeth that engage the notches grooves in the grooved sprocket 646. As best shown in FIG. 15, the belt 640 wraps around the sprocket 646 so that the teeth on the belt engaging the grooves in the sprocket maintain the tension in the belt. In addition, a portion of the end fitting 644 is in close proximity to the perimeter of the grooved sprocket such that when the belt is disposed between the fitting and the sprocket, e.g., the end of the belt in FIG. 15, the fitting prevents the belt from moving away from the sprocket enough for the teeth to disengage from the grooved sprocket.

The illustrated restraint 642 provides for adjustable belt tension. To adjust the tension in the belt 640, the set bolts 650 are removed, and the grooved sprocket is rotated to increase or decrease the tension in the belt to the desired level. The set bolts 650 are then reinstalled, thereby preventing rotation of the sprocket relative to the end fitting 644 and maintaining the tension in the belt at the desired level.

Figure 16:
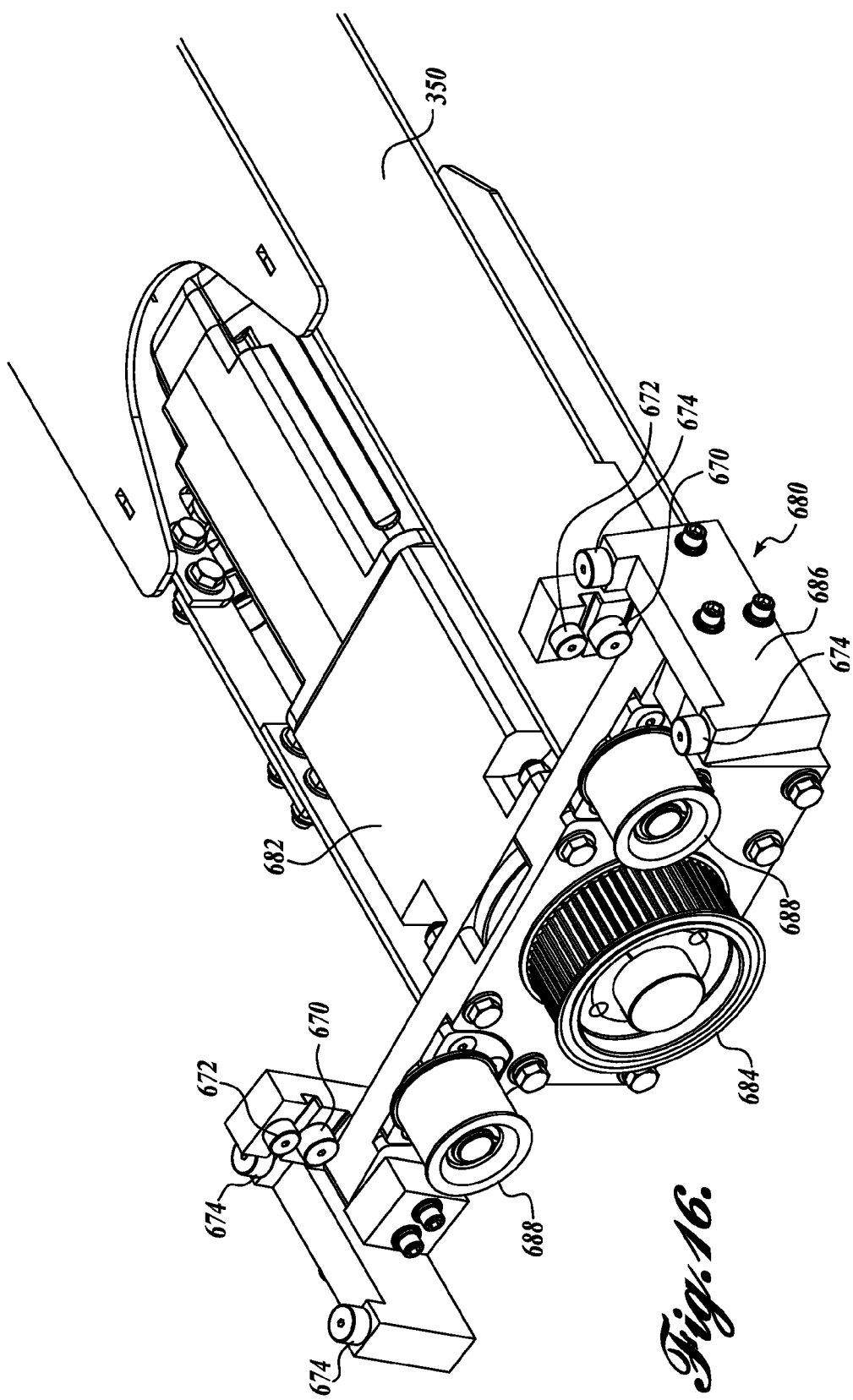
FIG. 16 shows a partial isometric view of a drive assembly of the simulation device shown in FIG. 13 with the capsule removed.

Referring now to FIG. 16, the drive assembly 680 includes a guide base 686 mounted to the lower, horizontal portion 354 of the frame 350. Support bearings 670 are spaced apart and mounted to the guide base 686 to be rotatably about parallel, generally horizontal axes. The support bearings 670 are sized and configured to supportingly engage the lower surface 652 (support surface) of the lower flange 632. That is, the support assembly rests on the support bearings 670, which rotate to allow the lower support of the lower flange to move relative to the guide base 686 while being supported by the bearings.

The support surface 652 is preferably of a constant radius having a center coincident with the axis of rotation 602 defined by the trunnion 600. In this manner, the capsule rotates about axis 602, supported by the trunnion 600 and the support bearings 670. It will be appreciated that the shape of the support surface 652 can vary from a constant radius. For such configurations, rotation of the capsule will cause the forward end of the capsule to move up and down as the radius increases and decreases, respectively. Accordingly, for such configurations, the rotational connection to the trunnion 600 is capable of accommodating the change in the orientation of the axis 602 that results from the forward end of the capsule moving up and down.

The drive assembly 680 further includes one or more retention bearings 672 positioned above the lower flange 632. The retention bearings 672 are rotatably coupled to the guide base 686 such that the lower flange 632 is partially disposed between the support bearings 670 and retention bearings. The support bearings 670 support the lower flange 632, and the retention bearings 672 limit the distance from the support bearings that the lower flange can travel. A plurality of guide bearings 674 is rotatably coupled to the guide base 686 to limit movement of the flange in the forward and aft direction, i.e., toward and away from the trunnion 600.

The illustrated drive assembly 680 supportingly engages the lower flange 632 of the support assembly 630 and allows movement of the lower flange along a path so that the capsule rotates about axis 602. It will be appreciated that variations to the disclosed embodiment are possible within the scope of the present disclosure. In one alternate embodiment, one or more of the bearings are fixed bearing surfaces with a suitable friction coefficient and durability to allow a portion of the lower flange to slidingly engage the surface. In other alternate embodiments, the size, number, location, and orientation of the bearings vary.

As shown in FIG. 16, the drive assembly 680 includes a motor 682 with an output shaft that selectively rotates a drive sprocket 684 in a first direction and a second direction. An idler sprocket 688 is rotatably mounted to the guide base 686 on each side of the drive sprocket 684. As best shown in FIG. 13, the synchronous belt 640 of the support assembly 630 engages the drive sprocket 684 so that rotation of the drive sprocket moves the belt. The idler sprockets 688 control the path of the belt so that the belt maintains contact with the drive sprocket 684. Because the belt 640 is coupled at both ends to the support assembly 630, movement of the belt moves the lower flange 632 along a path relative to the drive assembly 680, thereby selectively rotating the capsule 110 about axis 602. By selectively controlling the motor 682 to rotate the drive sprocket 684 in a first direction and a second direction, the roll of the capsule is controlled.

It will be appreciated that the illustrated restraint and synchronous belt are exemplary only and should not be considered limiting. In this regard, V-belts, cables, chains, compliant sheaves, or any other suitable method for operatively connecting the support assembly to the drive assembly are possible. Moreover, the belts, cables, etc., can be secured to the support assembly 630 by any suitable means, and one, both, or neither can be configured to allow for adjusting the tension of the belt, cable, etc. It is also contemplated that a rack and pinion system can be utilized to drive the support assembly to rotate the capsule. These and other configurations are contemplated and should be considered within the scope of the present disclosure.

Figure 17:
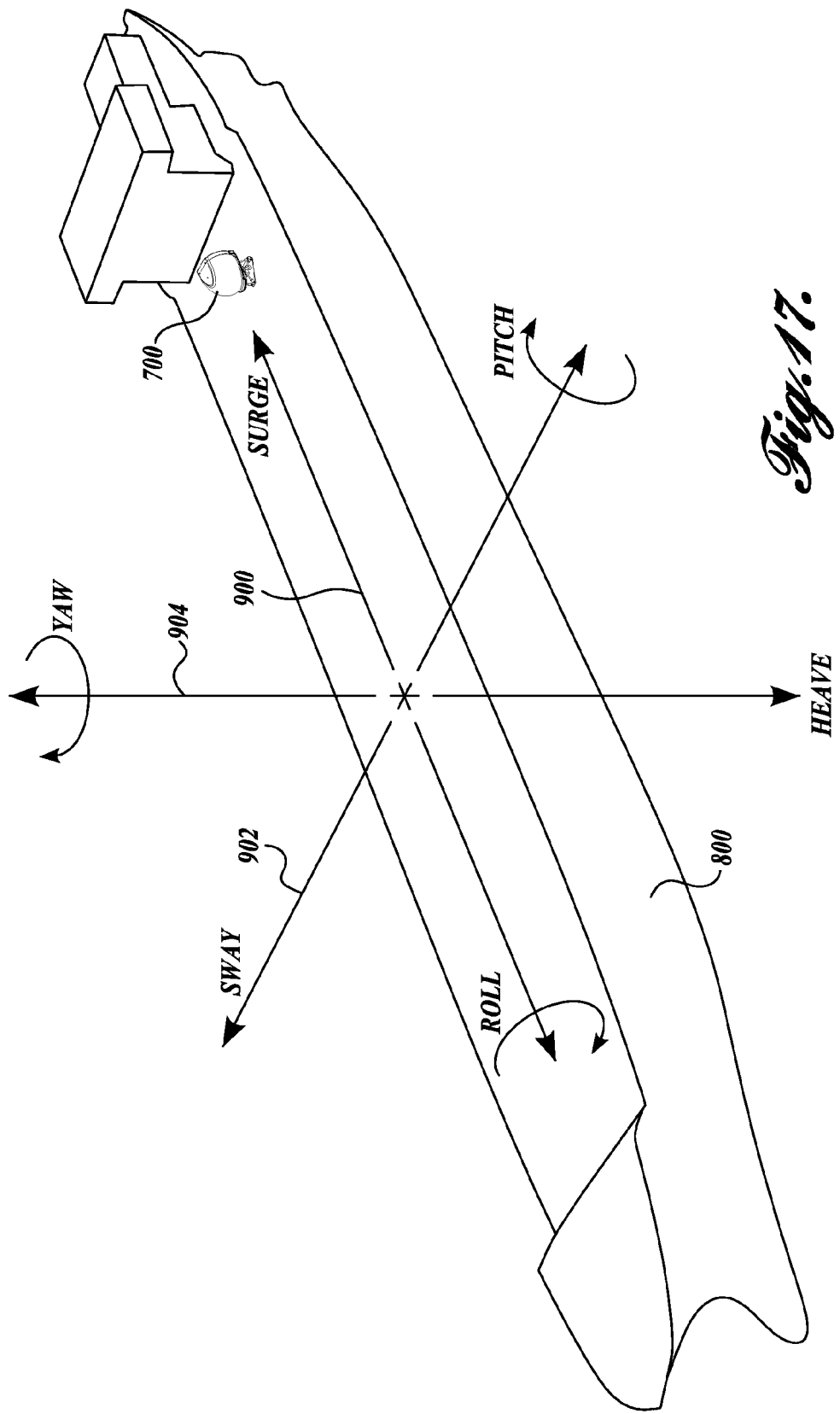
FIG. 17 shows an isometric view of a ship with a second embodiment of a simulation device on the deck.

Referring now to FIGS. 17-22, a second embodiment of a simulation device 700 is shown. FIG. 17 shows the simulation device 700 located aboard a ship 800. More specifically, the illustrated exemplary embodiment shows a single simulation device 700 secured to the deck of a ship 800. It will be appreciated that the present disclosure is not limited to a particular type of ship. In this regard, the simulation device 700 can be located on any ship capable of carrying the device. Moreover, the device can be utilized on trains, trucks, or any surface that would potentially move, as well as stationary surfaces. As described below, for locations that would potentially move, such as a ship or a train, the stabilization features of the simulation device mitigate or eliminate the effect of unwanted motion on the operator/passenger of the device. It will be further appreciated that multiple devices can be positioned on a single ship (or other location) and the number and location of devices in a particular area may vary within the scope of the present disclosure.

Still referring to FIG. 17 the ship 800 generally moves with six degrees of freedom in response to piloting of the ship, waves, wind, tides, etc. Translation along the longitudinal axis 900, lateral axis 902, and vertical axis 904 are referred to as surge, sway, and heave, respectively. Rotation about the surge axis 900, the sway axis 902, and the heave axis 904 are referred to as roll, pitch, and yaw, respectively. Depending upon weather, water conditions, ship operation, etc., the ship can experience, movement along and/or about any one or more of these axes 900, 902, 904, in various combinations.

Figure 18:
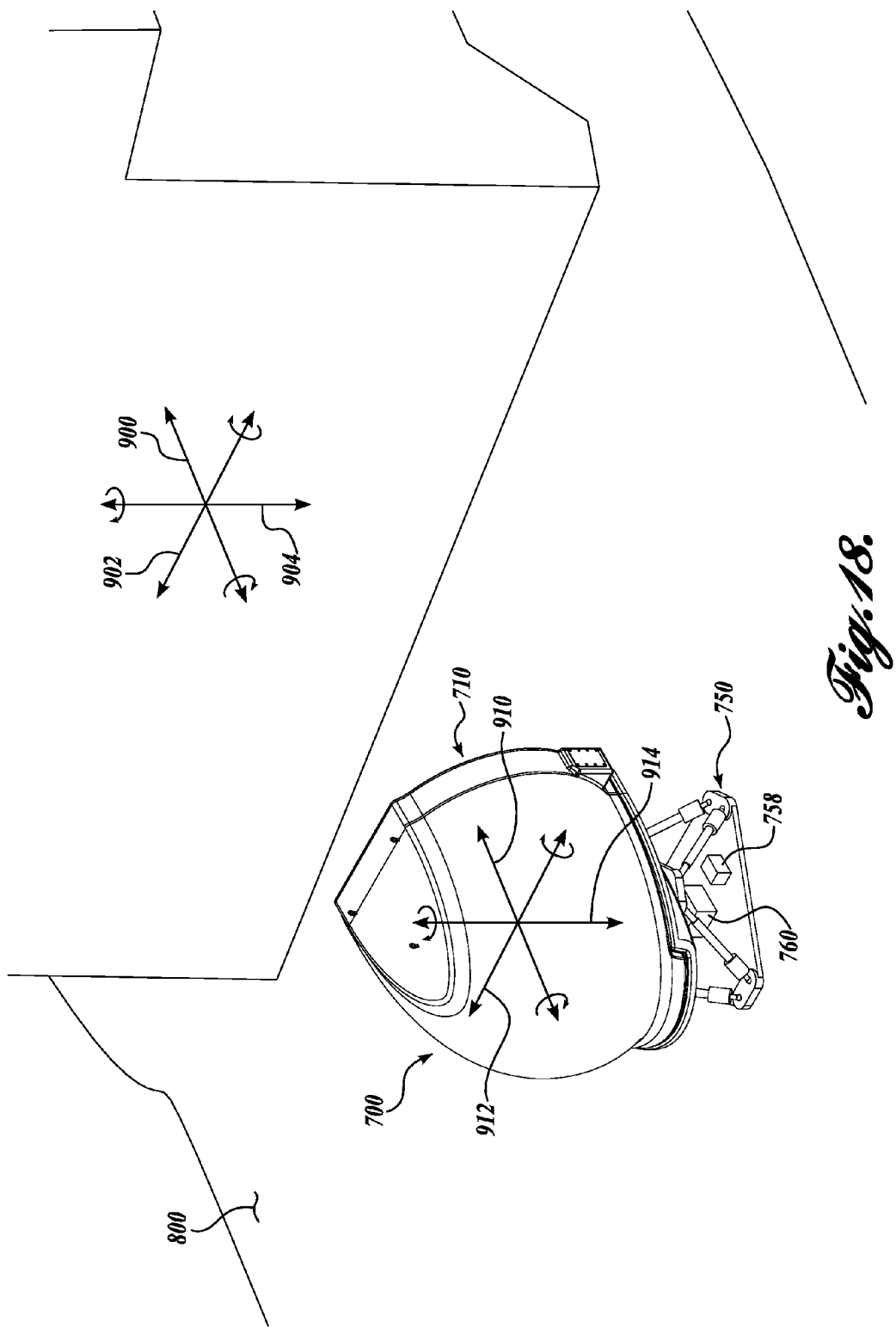
FIG. 18 shows an isometric view of the simulation device of FIG. 17.
Figure 19:
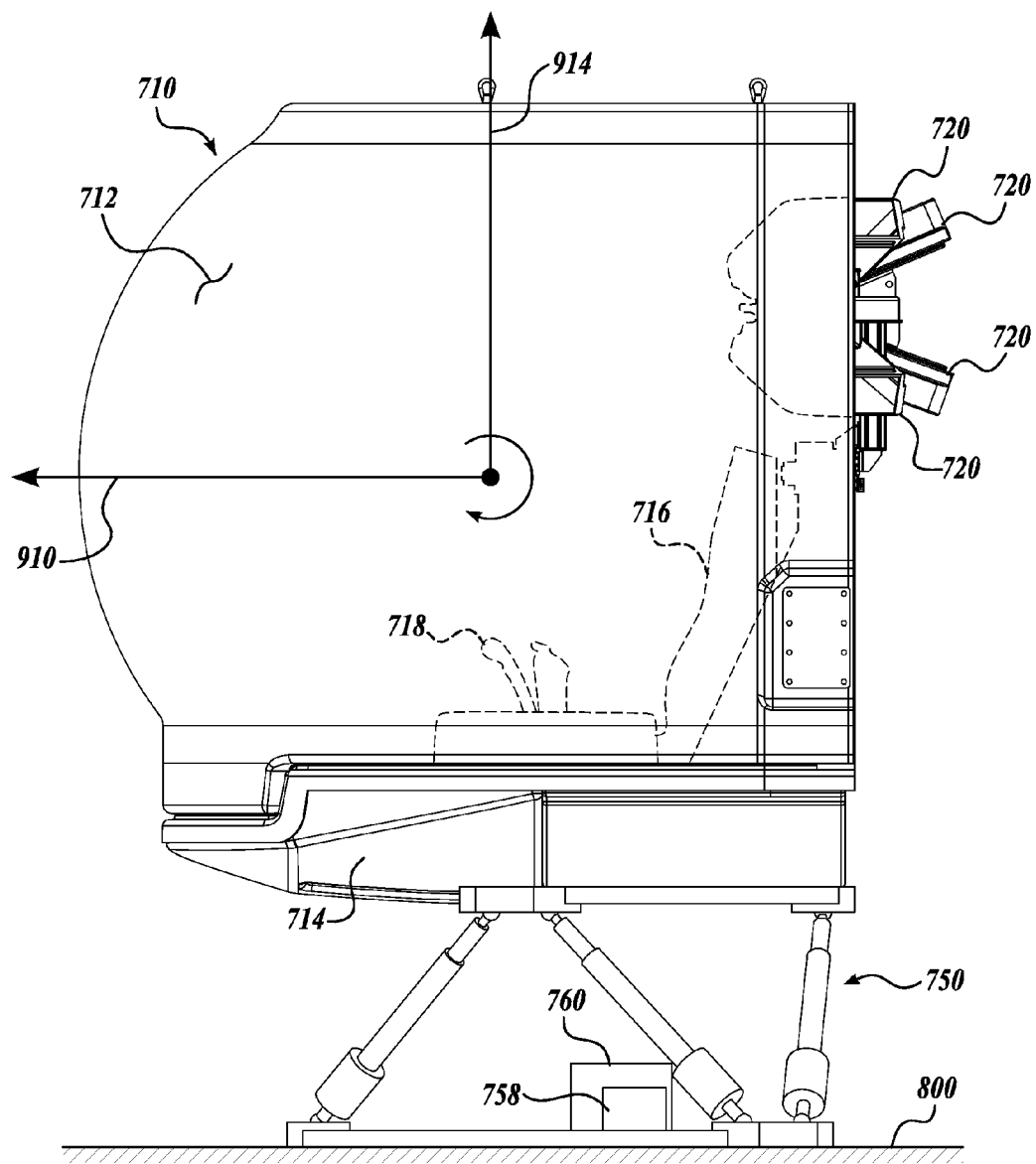
FIG. 19 shows a side view of the simulation device of FIG. 18.

Referring now to FIGS. 18 and 19, the illustrated embodiment of the simulation device 700 is located on the deck of the ship 800. The simulation device 700 includes a capsule 710 mounted to a motion base 750, which itself is mounted to the ship 800 in any suitable fashion. The capsule 710 is similar to the capsule 110 shown in FIGS. 1-16, wherein capsule components with reference numbers 7XX correspond to previously described like capsule components with reference numbers 1XX. For the sake of brevity, the descriptions of the similar components will not be repeated.

Figure 20:
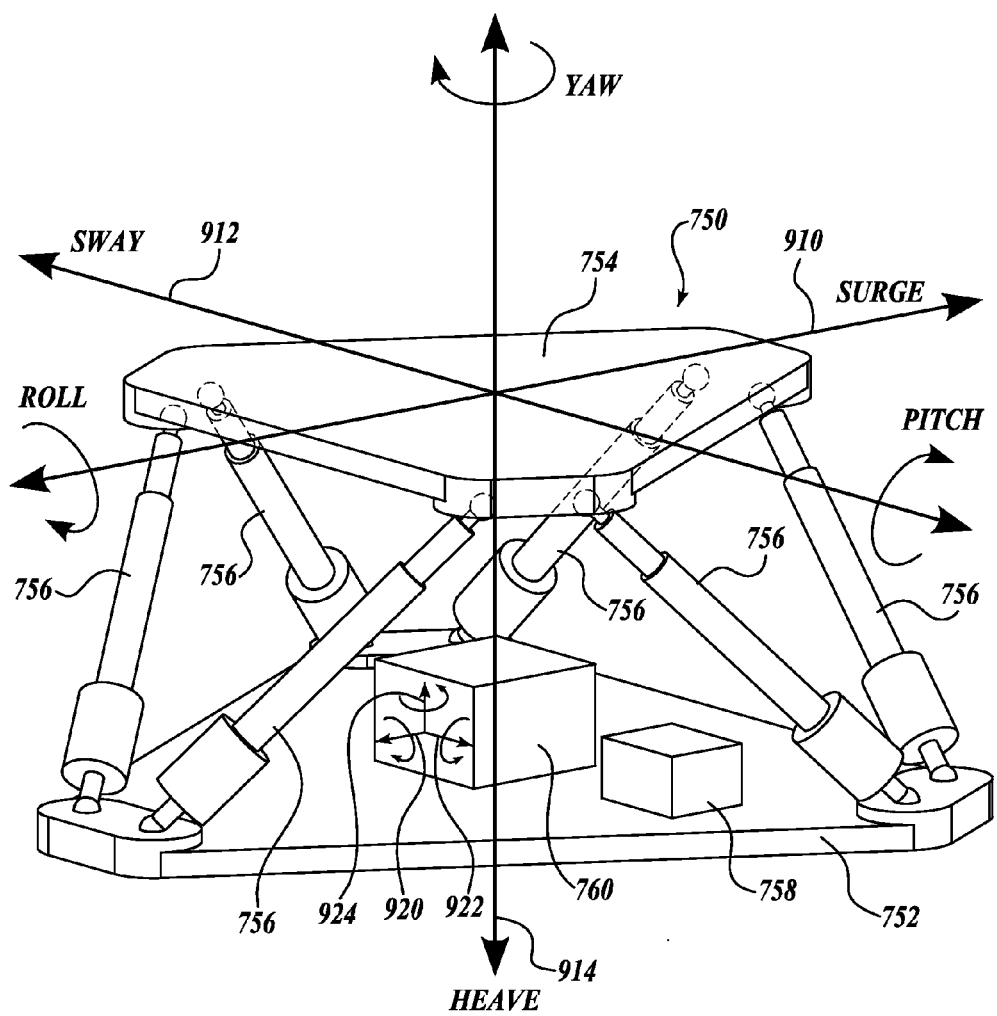
FIG. 20 shows an isometric view of a motion base of the simulation device of FIG. 18.

As best shown in FIGS. 18 and 20, the illustrated motion base 750 has a known "hexapod" or "Stewart platform" configuration. Exemplary embodiments of such configurations are described in U.S. Pat. No. 5,752,834, "Motion/Force Simulator with Six or Three Degrees of Freedom" (Ling), and U.S. Pat. No. 8,672,288, "Vessel Motion Platform, Method for Compensating Motions of a Vessel and Use of a Stewart Platform" (van der Tempel et al.), the disclosures of which are incorporated by reference herein. The illustrated embodiment of the motion base 750 includes a base plate 752 fixedly secured to the ship 800. A platform 754 is supported by three pairs of linear actuators 756 that extend upward from the base plate 752 to the platform 754. Each actuator 756 is pivotally coupled at one end to the base plate 752 and at a second end to the platform 754. For each pair of actuators 756, the first (lower) ends of the actuators are coupled to the base plate 752 proximate to each other. The second (upper) end of each actuator is coupled to the platform 754 proximate to the second end of an actuator from one of the other pairs. In this manner, each pair of actuators 756 forms an upward facing "V," wherein the three Vs are disposed around the perimeter of the base plate 752 and platform 754.

A controller 758 is in operable communication with each actuator 756 to selectively extend and retract each actuator. By selectively extending and retracting the actuators 756 in particular combinations, the controller 758 controls the position of the platform 754. More specifically, the controller 758 controls the actuators 756 to selectively translate the platform 754 along a longitudinal (surge) axis 910, a lateral (sway) axis 912, and a vertical (heave) axis 914. The controller 758 also controls actuators 756 to selectively rotate the platform 754 about the surge axis 910, the sway axis 912, and heave axis 914, wherein the rotations are referred to as roll, pitch, and yaw, respectively.

Variations of a Stewart platform are known, including, for example, configurations wherein rotary actuators and links or linkages take the place of one or more of the described linear actuators. It will be appreciated that such alternate configurations can be utilized within the scope of the present disclosure. It is further contemplated that the present disclosure can utilize any suitable motion base for imparting motion on a simulator capsule, including the motion base of FIGS. 1-16, or any other motion base capable of varying at least one of the surge, sway, heave, roll, pitch, and yaw of the capsule. Thus, the presently described motion compensation system can be adapted to any known simulation device so that the device compensates for environmental movement, thereby stabilizing the capsule so that only simulation forces are experienced by the user.

The capsule 710 is mounted to the platform 754 of the motion base 750 so that selective movement of the platform by the controller 758 imparts corresponding motion to the capsule. That is, the controller 758 selectively (1) translates the capsule 710 along and (2) rotates the capsule about axes 910, 912, and 914, to control the surge, sway, heave, roll, pitch, and yaw of the capsule.

The simulation device 700 includes a sensor 760 mounted to the base plate 752. In the illustrated embodiment, a single sensor 760 is a six degree of freedom inertial measurement unit (IMU). IMUs are known in the art and sense velocity, orientation, and gravitational forces using a combination of accelerometers, gyroscopes, and magnetometers. The sensor 760 is fixedly positioned relative to the ship by virtue of being mounted to the base plate 752. The sensor is capable of sensing translation along and rotation about a surge axis 920, a sway axis 922, and a heave axis 924.

It will be appreciated that the described sensor 760 is exemplary only, and various other embodiments may include different types and numbers of sensors. In this regard, multiple discrete sensors, each sensing one or more different velocities, orientations, and/or gravitational forces may be utilized. Further, while the disclosed sensor 760 is preferably a MEMS (microelectromechanical sensor) device, any suitable type of sensor may be utilized. Moreover, it should be understood that sensors or combinations of sensors with less than six degrees of freedom may be utilized.

Figure 21:
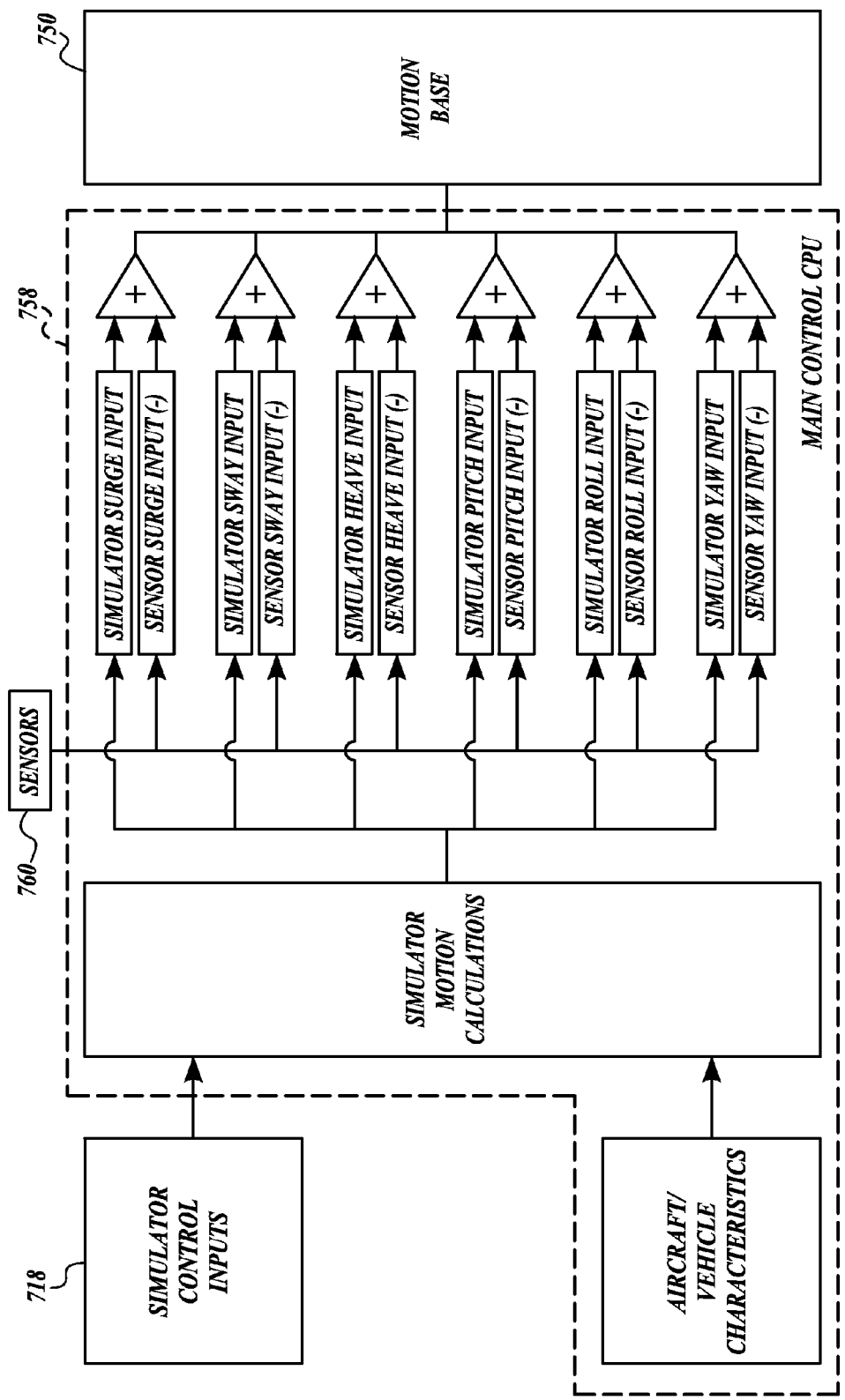
FIG. 21 shows a schematic view of a controller of the simulation device of FIG. 18.

Referring now to FIG. 21, the controller 758 is operably coupled to the sensor 760 to receive sensed positions and/or movement of the base plate 752 and, therefore, the ship 800. The controller 758 is also operably coupled to the simulator control input 718 to receive control signals from an operator. It will be appreciated that control input can also be received by input external to the simulator, for example, by a person outside of the simulator providing input to control various simulation scenarios during a simulation. The simulator also optionally receives input regarding an aircraft or vehicle to be simulated. Such input can be received in response to a user utilizing an input device (not shown) such as a keyboard or touchscreen. Alternatively, this input can be programmed into the controller or stored on a computer readable medium that is readable by the controller. These and other manners of providing simulation parameters are contemplated and should be considered within the scope of the present disclosure.

Similar to the embodiment of FIGS. 1-16, the controller 758 of FIG. 21 controls the motion base 750 to accelerate the capsule 710 along and about axes 910, 912, and 914 to provide accelerations corresponding to surge, sway, heave, roll, pitch and yaw. Each of these accelerations can be considered additive, so the controller generates a separate signal corresponding to each individual acceleration. By controlling the motion base according to a sum of the accelerations, the accelerations experienced by the capsule 710 combine with gravitational forces and the visual displays within the capsule to provide the operator with a more realistic simulation.

Because ship 800 motion imparts additional acceleration on the capsule 710, potentially interfering with the desired effect experienced by the occupant or occupants of the capsule, the controller 758 uses data sensed by the sensor 760 to mitigate the effect of ship motion. That is, the capsule is stabilized with respect to the motion of the ship 800. Still referring to FIG. 21, the controller 758 receives signals from the sensor 760 indicating changes to the surge, sway, heave, roll, pitch and yaw of the ship 800. For each of these motions, the corresponding sensed acceleration is subtracted from the simulated acceleration to be imparted on the capsule 710. As a result, the acceleration experienced due to the motion of the ship 800 is removed from the acceleration imparted on the capsule 710 so that the effects of the ship motion on the simulation are mitigated.

The surge, sway, and heave axes 920, 922, and 924 of the sensor 760 are preferably aligned with the corresponding surge, sway, and heave axes 910, 912, and 914 of the platform 754 of the motion base 750. As previously discussed, the sensor 760 is fixedly located relative to the ship 800. Because the sensor axes 920, 922, and 924 are aligned with the platform axes 910, 912, and 914, any motion of the ship 800 is sensed relative to the frame of reference of the capsule 710. Accordingly, there is a 1:1 correspondence between acceleration resulting from ship surge, sway, heave, roll, pitch and yaw, as sensed by the sensor 760 and how that motion would be experienced by the capsule 710.

Alternate embodiments are contemplated in which one or more of the sensor axes 920, 922, and 924 is not aligned with the corresponding platform axis 910, 912, and 914. For such embodiments, sensed accelerations can be resolved into corresponding capsule accelerations by applying a transformation matrix to the sensed accelerations.

In another contemplated embodiment, the sensor 760 is mounted to the capsule. Thus, the sensor 760 senses the combination of the simulation accelerations and the ship accelerations. For such embodiments, the controller 758 compares the sensed accelerations to the desired simulation accelerations and corrects the motion of the motion base 750 to eliminate or mitigate the effects of the ship accelerations.

Figure 22:
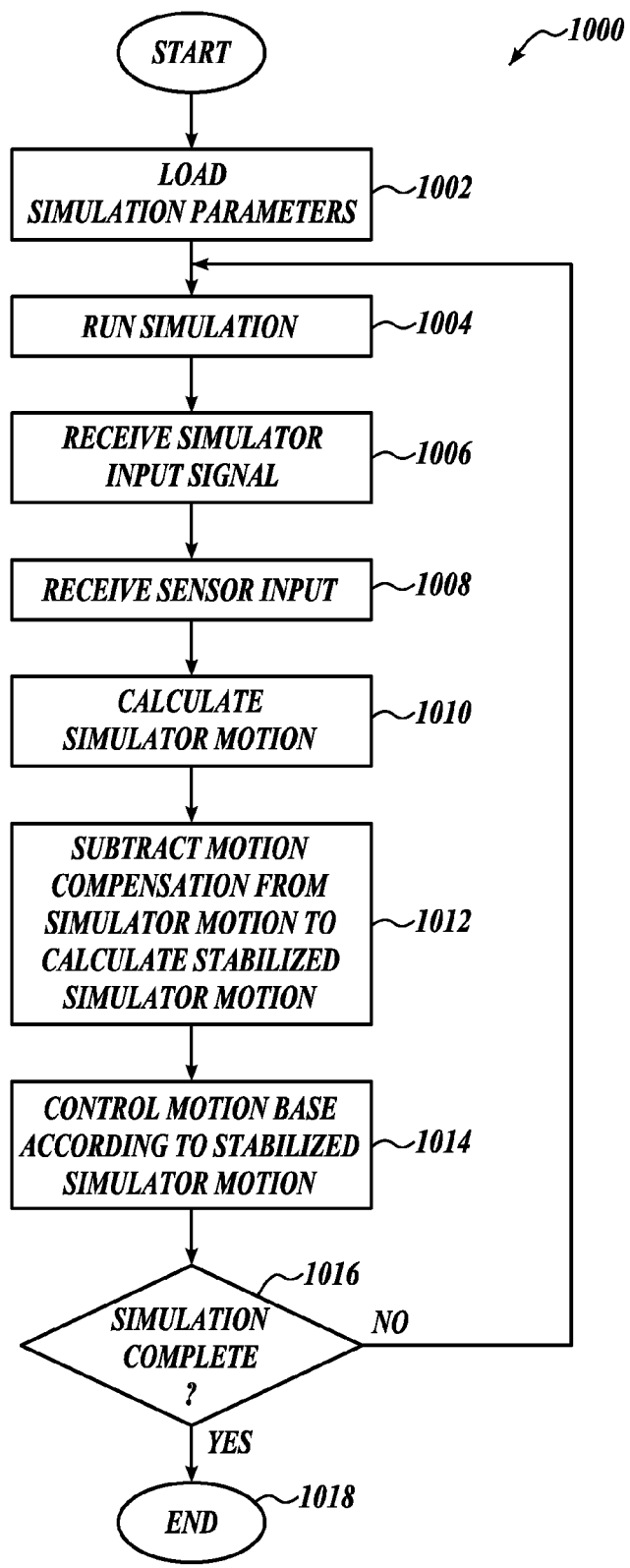
FIG. 22 shows a flow chart showing a method of controlling the simulation device of FIG. 18.

FIG. 22 illustrates one embodiment of a method 1000 of controlling a simulator. From a start block, the method 1000 proceeds to a set of method steps defined in blocks 1002 through 1016. The set of method steps describes steps in which information regarding moving a capsule to simulate an event is collected and utilized to move the capsule.

The set of method steps starts at block 1002, where simulation parameters are loaded into the controller. In one embodiment, the simulation parameters are entered by an operator. In another embodiment, the simulation parameters are preprogrammed on a computer readable medium. Simulation parameters may include information including aircraft being simulated, simulation goals, geographic location of simulated events, simulated weather conditions, etc.

Next, at block 1004, the simulation begins. From block 1004, the method 1000 continues to blocks 1006 and 1008, in which the simulator input signal and sensor input, respectively, are received by the controller 758.

From block 1008, the method 1000 continues to block 1010. At block 1010, the controller calculates simulator motion based on the simulator input signal and the simulator parameters. At block 1012, the method 1000 accounts for the motion of the ship by subtracting motion to compensate for ship motion from simulator motion. The method 1000 then proceeds to block 1014 in which the controller controls the capsule according to the stabilized simulator motion.

From block 1014, the method 1000 proceeds to block 1016, which is a decision block. If the simulation is not complete, the method proceeds back to block 1004, and the simulation continues. If the simulation is complete, the method proceeds to block 1018, and the method 1000 terminates.

The various blocks describing the method 1000 may be performed sequentially, in parallel, or in a different order than those described herein. As a nonlimiting example, blocks 1006 and 1010 may be performed in parallel with block 1008. It should also be appreciated that in some implementations one or more of the illustrated blocks may be eliminated, combined or separated into additional blocks. The described and illustrated method 1000 may also include various additional blocks not shown.

While illustrative embodiments have been illustrated and described, it will be appreciated that various changes can be made therein without departing from the spirit and scope of the invention.

The embodiments of the invention in which an exclusive property or privilege is claimed are defined as follows:

1. A simulation device, the device comprising:
   (a) a motion base mounted to a moveable surface;
   (b) a capsule mounted to the motion base, the capsule comprising a display configured to display images corresponding to a simulated event, wherein a user is positioned within the capsule during the simulated event, the motion base being configured to move the capsule relative to the moveable surface;
   (c) a sensor sensing movement of the moveable surface; and
   (d) a controller operably coupled to the sensor and to the motion base, the controller being programmed to receive a signal from the sensor and to control the motion base to move the capsule according to (i) the simulated event and (ii) the signal received from the sensor to impart a force corresponding to the simulated event on the user.

2. The simulation device of claim 1, wherein the moveable surface rotates about a first axis, and the motion base rotates the capsule about a second axis parallel to the first axis, wherein the sensor senses rotation of the moveable surface about the first axis.

3. The simulation device of claim 2, wherein the moveable surface rotates about a third axis that is perpendicular to the first axis, and the motion base rotates the capsule about a fourth axis parallel to the third axis, wherein the sensor senses rotation of the moveable surface about the third axis.

4. The simulation device of claim 1, wherein the moveable surface translates along a first axis, and the motion base translates the capsule along the first axis, wherein the sensor senses translation of the moveable surface along the first axis.

5. The simulation device of claim 4, wherein the moveable surface translates along a second axis that is perpendicular to the first axis, and the motion base translates the capsule along the second axis, wherein the sensor senses translation of the moveable surface along the second axis.

6. The simulation device of claim 1, wherein the motion base comprises a Stewart platform.

7. The simulation device of claim 1, wherein the sensor is an inertial sensor.

8. The simulation device of claim 7, wherein the sensor is a six degree of freedom sensor.

9. The simulation device of claim 7, wherein the sensor is fixedly located relative to the moveable surface.

10. A simulation device for use on a ship, the device comprising:
    (a) a motion base mountable to the ship;
    (b) a capsule mounted to the motion base, the capsule comprising a display configured to display images corresponding to a simulated event, wherein a user is disposed within the capsule during the simulated event, the motion base being configured to move the capsule relative to the ship;
    (c) a user input;
    (d) at least one sensor sensing movement of the ship; and
    (e) a controller operably coupled to the at least one sensor, the user input, and the motion base, the controller receiving a signal from the sensor and the user input, the controller being programmed to control the motion base to move the capsule according to (i) the simulated event, (ii) the user input, and (iii) the signal received from the sensor to impart a force corresponding to the simulated event on the user.

11. The device of claim 10, wherein the simulation device is a flight simulator.

12. The device of claim 11, wherein the motion base moves the capsule to simulate pitch and roll.

13. The device of claim 12, wherein the sensor senses movement of the ship causing the capsule to pitch and roll.

14. The device of claim 13, wherein the controller controls the motion platform to cancel pitch and roll of the capsule caused by the movement of the ship.

15. A method of imparting a force corresponding to a simulated event to a simulation capsule located on a moving surface, the method comprising the steps of:
    (a) receiving a signal from a sensor that senses movement of the moving surface;
    (b) determining motion of the capsule to impart a force on an occupant of the capsule to simulate the event; and
    (c) correcting the motion of the capsule to compensate for movement of the moving surface.

\* \* \* \* \*